(12) United States Patent
Przygienda et al.

(10) Patent No.: US 6,563,823 B1
(45) Date of Patent: May 13, 2003

(54) MULTI-RESOLUTION TREE FOR LONGEST MATCH ADDRESS LOOKUPS

(75) Inventors: Antoni B. Przygienda, Middletown, NJ (US); John Chanak, Menlo Park, CA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 08/960,672

(22) Filed: Oct. 30, 1997

(51) Int. Cl.[7] .............................................. H04L 12/28
(52) U.S. Cl. ...................................... 370/392; 370/428
(58) Field of Search ................................ 370/389–392, 370/400, 401, 410, 412, 351, 255, 474, 475; 707/3, 7, 6, 8, 9; 709/222, 238, 249, 201, 202, 220–225, 243, 240–242; 711/1, 6, 200–221

(56) References Cited

U.S. PATENT DOCUMENTS

| | | | | |
|---|---|---|---|---|
| 4,841,433 A | * | 6/1989 | Hakim et al. .................. 707/3 |
| 5,745,892 A | * | 4/1998 | Miyata et al. ............... 707/102 |
| 5,860,058 A | * | 1/1999 | Daniel et al. ............... 455/12.1 |
| 5,917,820 A | * | 6/1999 | Rekhter ....................... 370/392 |
| 5,946,679 A | * | 8/1999 | Ahuja et al. ................... 707/3 |
| 5,983,223 A | * | 11/1999 | Perlman ........................ 707/6 |
| 5,987,520 A | * | 11/1999 | Libby et al. ................ 709/238 |
| 6,011,795 A | * | 1/2000 | Varghese et al. ............ 370/392 |
| 6,052,683 A | * | 4/2000 | Irwin ............................ 707/8 |
| 6,067,574 A | * | 5/2000 | Tzeng ........................ 709/247 |
| 6,104,701 A | * | 8/2000 | Avargues et al. ............ 370/238 |
| 6,141,738 A | * | 10/2000 | Munter et al. ............... 711/206 |
| 6,181,698 B1 | * | 1/2001 | Hariguchi .................... 370/392 |
| 6,208,649 B1 | * | 3/2001 | Kloth ........................ 370/392 |
| 6,266,706 B1 | * | 7/2001 | Brodnik et al. ............. 370/238 |

* cited by examiner

Primary Examiner—Dang Ton
(74) Attorney, Agent, or Firm—Ansel M. Schwartz

(57) ABSTRACT

A method and apparatus for forwarding packets in a network is described. A routing table is constructed using p-structures. An address for a packet is received. The address is matched with a longest prefix stored in the routing table. A decision value associated with the longest prefix is retrieved. The packet is forwarded in accordance with the decision value.

55 Claims, 11 Drawing Sheets

ADDRESS  TABLE  MATCH PREFERENCE

MULTI-RESOLUTION TREE FOR LONGEST MATCH ADDRESS LOOKUPS

FIELD OF THE INVENTION

The present invention relates to forwarding devices in general. More particularly, the present invention relates to a method and apparatus for performing longest match address lookups for routing a packet or cell of information in a network.

BACKGROUND OF INVENTION

The popularity of communications networks such as the Internet and World Wide Web (WWW) is growing at a phenomenal rate. Part of the reason for this growth is the rich amount of content available through these networks, as well as the ability to provide interactive communications services. For example, it is currently possible to place a telephone call using the Internet rather than the Public Switched Telephone Network (PSTN). Moreover, it is possible to engage in multi-media communications over the Internet, such as video conferencing, telecontrol, distributed computer applications, multimedia conferencing, remote visualization, high definition television (HDTV) and even virtual reality.

The increase in usage of the Internet increases the basic unit of transfer used by the Internet, namely data packets. The Internet is already required to process hundreds of thousands of packets per second, with indications that it must process millions of packets per second to maintain pace with user demand. In response to this demand, communications technologies have been developed which significantly improve the number of packets which can be moved through the network.

A problem still persists, however, with a class of network devices which are integral to combining disparate networks together. These network devices are collectively referred to as forwarding devices, examples of which include packet switches, routers and bridges. The basic function of a forwarding device is exactly as it sounds, that is, the forwarding device takes a data packet, looks up forwarding information needed to route the packet to its destination, and forwards the packet to another network device using the forwarding information.

A forwarding device accomplishes this basic routing or directing function by utilizing a routing table. A routing table comprises destination addresses and forwarding information used by the forwarding device to direct a packet to its next or ultimate destination. In recent years, the sheer number of destination addresses required for the routing table have caused forwarding devices to become saturated in terms of processing power and memory allocation. Lookup algorithms designed to compare a destination address retrieved from a packet with the ever-growing number of destination address stored in the routing table are far too slow and inefficient to meet current forwarding device throughput requirements.

In an attempt to reduce the number of destination addresses required for a routing table, a new Internet addressing scheme was developed which is referred to as Classless Interdomain Routing (CIDR). CIDR aggregates or groups IP addresses together in hierarchical levels, similar to the hierarchical addressing scheme used to route a telephone call to a specific call recipient using a telephone number. Take for example the telephone number 412-555-1212. The area code (i.e., 412) indicates the general area of the call recipient, while the next three digits (e.g., 555) further narrows down the location to a more specific local, while the last four digits (i.e., 1212) identifies the precise location of the called party. CIDR groups IP addresses together in a similar hierarchical pattern, with the leftmost bits of an IP address giving the location of a particular network, while the location of a network device or host becomes increasingly specific as the address reads to the rightmost bit. For example, a typical Internet address under the IP version 4 (IPv4) addressing scheme might be 1.1.1.2 in decimal form, which is represented in binary form as a sequence of 32 binary bits, i.e., 00000001.00000001.00000001.00000010. CIDR is a method of identifying those address bits which are meaningful for routing a packet to its next destination. Since the Internet is comprised of a plurality of forwarding devices, it is sometimes unnecessary to have a complete destination address for each packet in the routing table. Rather, an abbreviated address could be used which merely represents forwarding information to the next forwarding device. This is referred to as "hop-by-hop forwarding." Thus, instead of using 00000001.00000001.00000001.00000010 to index forwarding information for a packet, CIDR assigns a prefix for each address, the prefix comprising an IP address and some indication of the leftmost contiguous significant bits within this address. For example, the CIDR prefix 1.1.1.2/16 would mean that only the first 16 bits of the address 1.1.1.2 are significant for routing purposes. The result is fewer destination addresses are required for each Internet forwarding device's routing table.

Although CIDR reduced the number of destination addresses stored in a routing table, CIDR also complicated the lookup algorithms required to lookup forwarding information stored in the table. Under CIDR, routing to all destinations is always performed on a longest match basis. It may occur that a routing table may have different length prefixes of the same network which match the destination address of a packet. When a forwarding device must decide between two different length prefixes of the same network, it will always follow the longer mask. By way of analogy, if a switch in the PSTN had a choice to route a call using just the area code, or the area code and next three digits, the switch would use the area code plus three digits to route the call since it is more precise. As an example for a forwarding device, assume that a forwarding device has the following two CIDR prefixes in its routing table: (1) 198.32.1.0/24 via path 1 and (2) 198.32.0.0/16 via path 2. When trying to deliver traffic to host 198.32.1.1., the forwarding device tries to match the destination with the longest prefix and in this case would deliver the traffic via path 1. Thus, the longest match rule imposed by CIDR requires that for each destination address embedded within a packet, the lookup algorithm must search the entire routing table for the longest prefix.

The CIDR longest match rule can be better understood with reference to FIG. 1. FIG. 1 is a diagram for a logical representation of the longest match rule. A data packet is received by a forwarding device with an IP address of 124.13.7.5. The forwarding device uses a lookup algorithm to search for matching prefixes within a routing table 16. Routing table 16 contains prefixes with varying levels of granularity, with the meaningless bits represented by the letter "X". The search first uncovers the matching prefix 124.X.X.X (referred to as match preference three). Since the longest match rule requires that the entire routing table be searched for the longest prefix that matches the destination address, the forwarding device must continue searching routing table 16. The continued search uncovers a second match preference of 124.13.X.X. Since the address 124.13.7.5 more closely resembles 124.13.X.X, this match preference is more desirable the match preference three since it more specifically identifies a route for the packet. Finally, the search uncovers a first match preference of 124.13.7.X. Since this prefix is the closest match to the address 124.13.7.5 in routing table 16, the forwarding device will use the forwarding information associated with this prefix to route the packet to its next destination.

Different lookup solutions such as the hash, radix tree, Patricia tree and cached variations thereof, have been developed to perform longest match lookups required by CIDR. The conventional lookup solutions, however, are unsatisfactory for a number of reasons. For example, all of the conventional solutions suffer under the fact that the number of steps necessary for a longest match lookup can grow large in certain cases. This leads to more frequent memory accesses, which slow down the lookup process. Current state of the art solutions such as Patricia trees or radix trees can degenerate to as many as 32 memory accesses per IPv4 address lookup. This is because Patricia tree or radix tree algorithms compare individual bits of a destination address with individual bits stored in the routing table. Since there are 32 bits in the destination address, there are 32 levels of bits stored in the routing table. Therefore, it is possible that each bit of the destination address must be compared with each level of the routing table if the longest match prefix happens to be at the bottom level. Since each bit comparison requires at least one memory access, a single lookup using Patricia tree or radix tree solutions could require up to 32 memory accesses for a worst case scenario. Moreover, these solutions only work for limited amount of addresses, caches have to be populated and de-populated often, and they require fairly complex lookup algorithms which further slow down forwarding device throughput.

The following example will help demonstrate the above problems. Current user demands indicate that forwarding devices need to process at least a million packets per second. A million packets per second is equivalent to 1 millisecond per packet, or 1000 nanoseconds per packet. It is desirable for forwarding devices to utilize inexpensive 60 nanosecond Dynamic Random Access Memory (DRAM) to store routing tables in order to decrease hardware costs associated with forwarding devices. Thus, every time the forwarding device needs to access a piece of data in a routing table stored in inexpensive DRAM, it takes 60 nanoseconds. Conventional lookup algorithms such as those associated with the Patricia tree solution require at least 32 memory accesses per IPv4 address lookup assuming a worst case scenario, which at 60 nanoseconds per access requires 1920 nanoseconds per packet or lookup. Consequently, forwarding devices using conventional lookup algorithms are not capable of processing one million packets per second, since this would require 1000 nanoseconds per lookup, and the best conventional lookup algorithms can only reach 1920 nanoseconds per lookup under worst case conditions.

Various techniques such as "pipelining" and "parallel processing" have been implemented to improve the performance of conventional lookup algorithms. Even with these performance enhancing techniques, however, forwarding devices utilizing conventional lookup algorithms are not capable of reaching the desired throughput speeds without significantly increasing the cost of the forwarding device itself.

Another problem with conventional forwarding devices is the maintenance of the routing table. According to principles well-known in the art, the routing table,for a forwarding device must be periodically updated to reflect address and routing changes throughout the network. Conventional maintenance techniques, however, cannot update a routing table without preventing the forwarding device from utilizing the routing table. This is because conventional techniques read-lock those routing table entries that are currently being updated. This means that if a packet destination address requires the lookup of a routing table entry that is currently being updated, the packet will have to wait until the updating process is finished before being forwarded, or in the worst case scenario, be dropped from the network entirely.

In view of the foregoing, it can be appreciated that a substantial need exists for a innovative longest match lookup solution which solves the above-discussed problems.

SUMMARY OF THE INVENTION

One embodiment of the invention comprises a method and apparatus for forwarding packets in a network. A routing table is constructed using p-structures. An address for a packet is received. The address is matched with a longest prefix stored in the routing table. A decision value associated with the longest prefix is retrieved. The packet is forwarded in accordance with the decision value.

This embodiment of the invention matches an address with the longest stored prefix by first initializing a current partition member to a first partition member. The address is then translated into a p-structure index utilizing partition information stored for the current partition member. A decision value associated with the index is stored. A test is made to determine if there is a pointer associated with the index. If there is a pointer associated with the index, the current partition member is set to a next partition member associated with the pointer. This process is repeated until there are no more pointers associated with last index.

This embodiment of the invention translates the address into a p-structure index utilizing partition information stored for the current partition member by first storing the address in a register. A mask associated with the current partition member is then retrieved. The address is then masked with the partition mask, and shifted to the right in accordance with a shift value associated with the current partition member.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
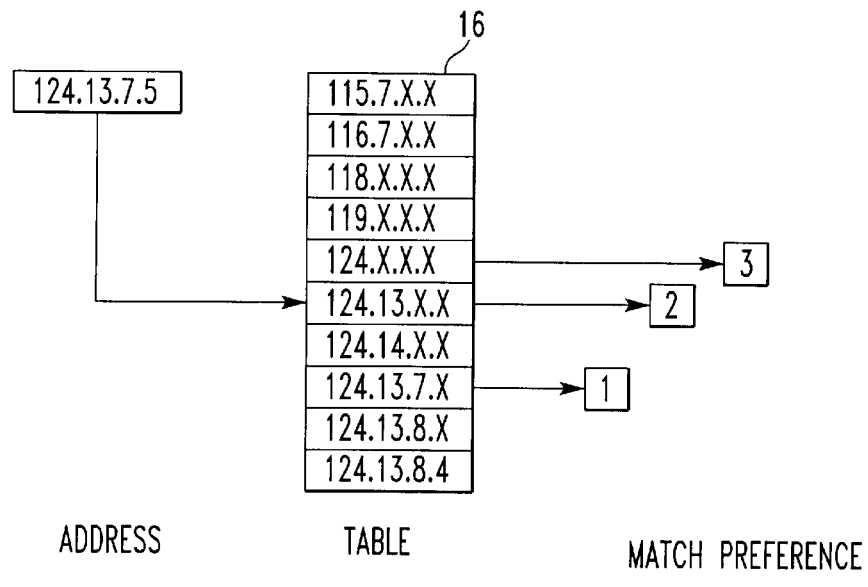
FIG. 1 is a diagram for a logical representation of the longest match rule.
Figure 2:
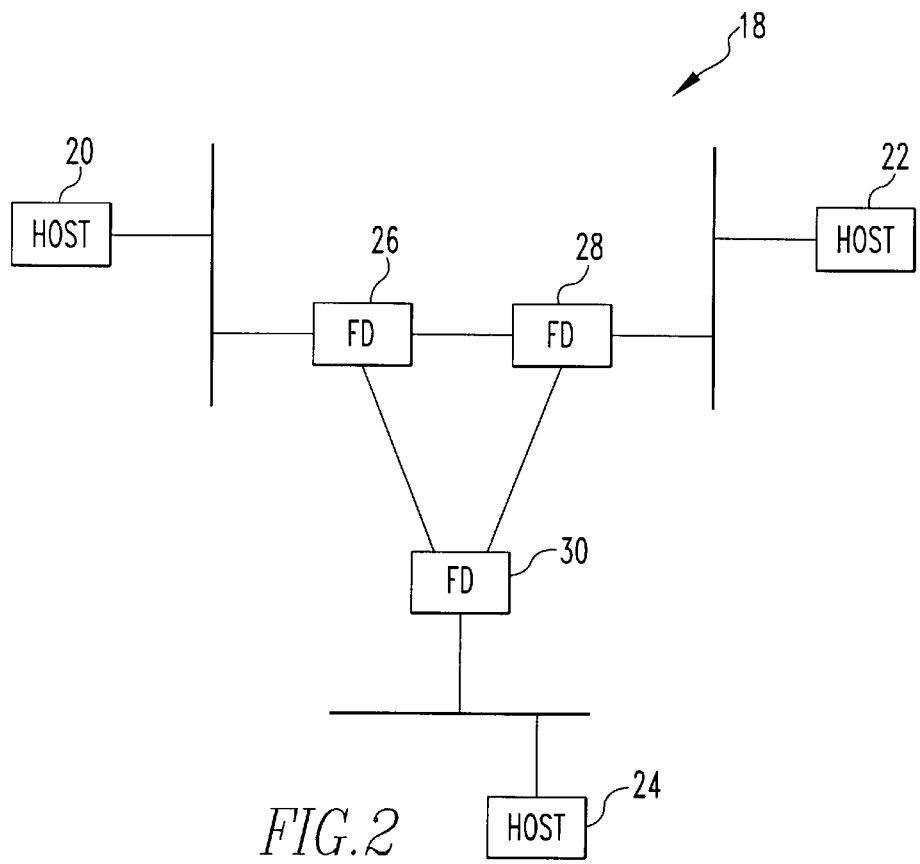
FIG. 2 is a diagram of a communications network suitable for practicing one embodiment of the invention.

Referring now in detail to the drawings wherein like parts are designated by like reference numerals throughout, there is illustrated in FIG. 2 a diagram of a communications network suitable for practicing one embodiment of the invention. A network 18 is comprised of multiple hosts 20, 22, and 24, which are connected via network links to forwarding devices 26, 28 and 30, respectively. Although network 18 has been reduced in size for explanation purposes, it can be appreciated that actual networks may have thousands of forwarding devices, with numerous hosts connected to each forwarding device.

Network 18 is a connectionless-oriented network utilizing the Transmission Control Protocol/Internet Protocol (TCP/IP). Each network device in network 18 is assigned a unique address using the Internet Protocol Version Four (IPv4) or Six (IPv6) addressing scheme. This unique address is used by forwarding devices 26, 28 and 30 to direct or route a data packet from one host to another host.

Figure 3:
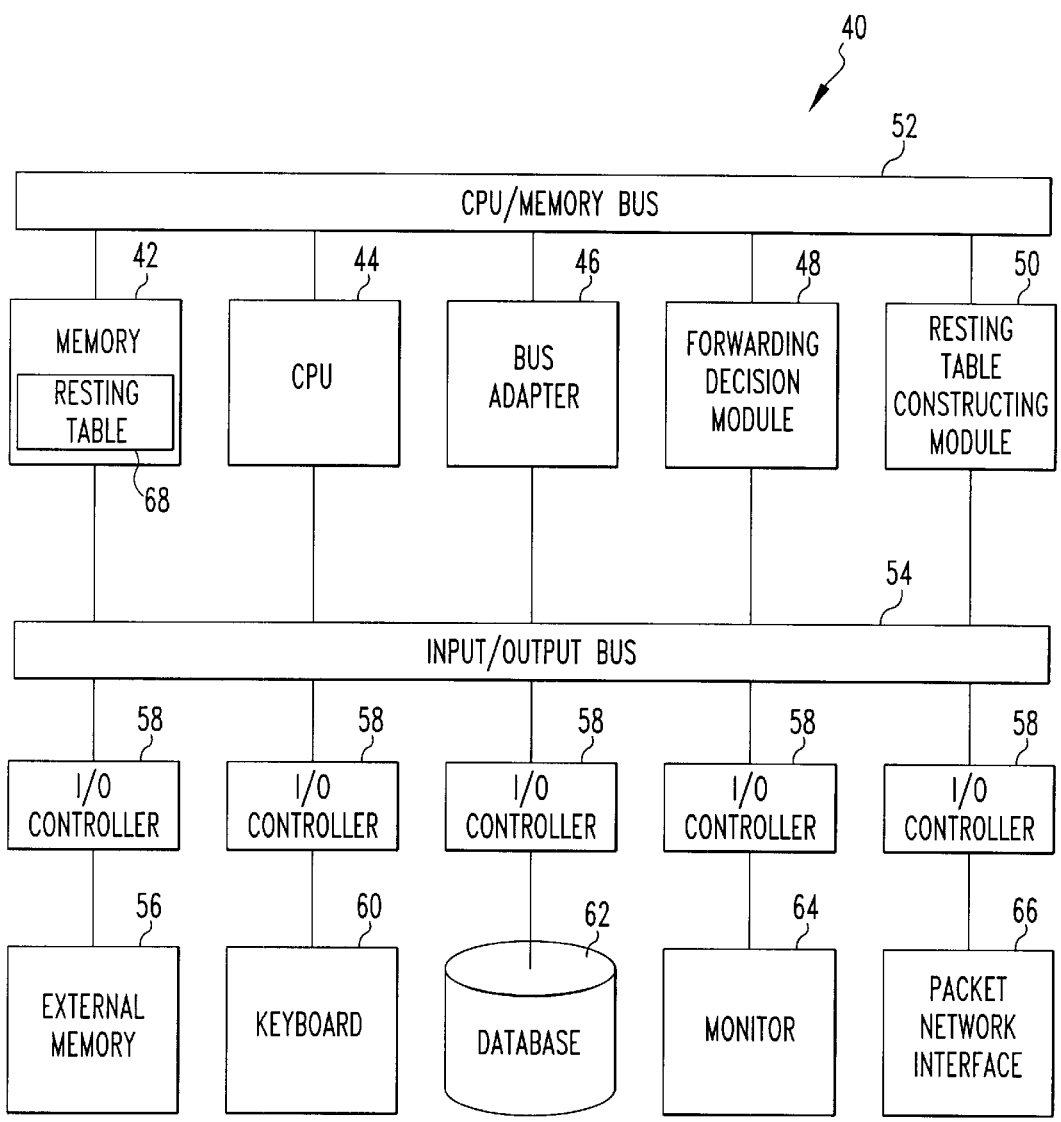
FIG. 3 is a block diagram of a forwarding device suitable for practicing one embodiment of the invention.

FIG. 3 is a block diagram of a forwarding device suitable for practicing one embodiment of the invention. In this embodiment of the invention, forwarding devices 26, 28 and 30 are general purpose computers configured with special software and/or hardware to perform the functionality for this embodiment of the invention. As shown in FIG. 3, a forwarding device 40 comprises a main memory module 42, a central processing unit (CPU) 44, a bus adapter 46, a forwarding decision module 48, and a routing table constructor module 50, each of which is connected to a CPU/memory bus 52 and an Input/Output (I/O) bus 54 via bus adapter 46. Further, forwarding device 40 contains multiple I/O controllers 58 connecting an external memory 56, a keyboard 60, a database 62, a monitor 64, and a packet network interface 66 to I/O bus 54.

The overall functioning of forwarding device 40 is controlled by CPU 44, which operates under control of executed computer program instructions that are stored in main memory 42 or external memory 56. Main memory 42 may be any type of high-speed machine readable storage device, such as random access memory (RAM), dynamic read only memory (DRAM), static read only memory (SRAM), read only memory (ROM), programmable read only memory (PROM), erasable programmable read only memory (EPROM), electronically erasable programmable memory (EEPROM), and so forth. External memory 56 may be any type of machine readable storage device which is capable of storing data but from which data can be accessed at lower speeds than main memory 42, such as magnetic storage media (i.e., a magnetic disk) or optical storage media (e.g., CD-ROM). Further, forwarding device 40 may contain various combinations of machine readable storage devices through other I/O controllers, which are accessible by CPU 44, and which are capable of storing a combination of computer program instructions and data. For example, database 62 may comprise the same structure listed with reference to main memory 42 or external memory 56, but is located remotely from forwarding device 40.

CPU 44 includes any processor of sufficient processing power to perform the functionality for this embodiment of the invention. Examples of CPUs suitable to practice this embodiment of the invention include the Pentium family of processors, such as the Pentium®, Pentium® Pro and Pentium® II processors, available from Intel Corporation.

Bus adapter 46 is used for transferring data between CPU/memory bus 52 and I/O bus 54. Bus adapter 46 operates using techniques and principles that are well-known to those skilled in the art.

I/O controllers 58 are used to control the flow of information between forwarding device 40 and external devices or networks such as external memory 56, keyboard 60, database 62, monitor 64 and packet network interface 66. The functions of these external devices are well-known, and will not be described in detail herein. By way of brief explanation, however, packet network interface 66 is used for communications between forwarding device 40 and other network nodes connected to network 18. In this embodiment of the invention, interface 66 is configured to communicate packets using the TCP/IP protocol. It can be appreciated, however, that other packet interfaces suitable for use with other packet transfer protocols can be implemented in forwarding device 40 and still fall within the scope of the invention. Further, forwarding device 40 could have multiple interfaces depending on the required number of physical connections to network 18.

Routing table construction module 50 implements the functionality for organizing, constructing and maintaining a routing table 68 stored in main memory 42. Module 50 specifies a data structure used for routing table 68, and the algorithms used to construct and maintain routing table 68 in accordance with the data structure.

Forwarding decision module 48 implements the functionality for a longest match address lookup algorithm suitable for use with a routing table organized in accordance with the principles outlined with routing table constructing module 50. Forwarding decision module 48 performs longest match address lookups for any length address lookups which are, for example, part of routing table 68 stored in main memory 42.

In this embodiment of the invention, the functionality of routing table constructing module 50 and forwarding decision module 48 is demonstrated utilizing the IPv4 addressing scheme and CIDR. It can be appreciated, however, that the functionality of modules 48 and 50 can be implemented for other addressing schemes (e.g., IPv6) and still fall within the scope of the invention.

The functionality of each of modules 48 and 50 may be implemented in hardware, software, or a combination of hardware and software, using well known signal processing techniques. In this embodiment of the invention, the functionality for modules 48 and 50 is implemented in software, with the overall functioning of modules 48 and 50 controlled by CPU 44. CPU 44 operates under control of executed program instructions which are stored in main memory 42 or various combinations of machine readable storage devices, which are accessible by CPU 44, and which are capable of storing a combination of computer program instructions and data required to implement the functionality of modules 48 and 50. CPU 44 is capable of executing multiple processes at the same time, and in this way implements the functions of modules 48 and 50. The processes for modules 48 and 50, however, can also be executed by multiple CPUs (i.e., parallel processing) which will be described in more detail later in this detailed description.

It is worthy to note that modules 48 and 50 are shown as separate functional modules in FIG. 3. It can be appreciated, however, that the functionality for modules 48 and 50 can be combined to form a single module, or separated into further modules, and still fall within the scope of the invention.

The operation of modules 48 and 50 will be described in general form, with specific examples to follow. The operations of these modules may be better understood, however, if the general principles underlying the organization of routing table 68 are first described.

The organization of routing table 68 begins with the underlying assumption that an address is split according to some given, fixed boundaries or partitions. The partition for an address is represented as an ordered set of numbers:

$\Theta = \{\theta_n : n \in N\}$

For example, an address may be partitioned as $\{12, 10, 12\}$, meaning that the address is split into three stages with consecutively 12, 10 and 12 bits each. The number of partitions defines the maximum number of memory accesses forwarding device 40 will have to make in order to find the longest matching address to the destination address of a packet. It should be noted that for a given i there are maximally $2^{\theta i-1}$ p-structures necessary.

Although this embodiment of the invention will work with partitions of any size, the exact size of the partitions will be generally influenced by the distribution of lengths of address prefixes used to build a routing table in a system. Further, the exact size of the partitions will determine the balance between memory requirements and the maximal number of steps forwarding decision module 48 has to perform for the lookup of a full address. Within these general parameters, a partition size can be developed which is optimized for a particular system utilizing this embodiment of the present invention.

In addition, the notion of a complementing subset of a bit sequence will be helpful for understanding the organization of routing table 68. A complementing subset of a bit sequence is defined for a binary number:

$$B_{\alpha,\beta} = b_\beta b_{\beta-1} \ldots b_\alpha \ldots b_0 = \sum_{n=\alpha}^{\beta} b_n * 2^n = b_\beta \ldots b_\alpha \underbrace{00 \ldots 0}_{\alpha}$$

as $\hat{B}_\alpha := \{\lambda \in N : \lambda < 2^{\alpha} \wedge \lambda \geq 0\}$ which translates, e.g., for a bit sequence $B_{3,2}=1100_2$ into $\hat{B}_2=00_2, 01_2, 10_2, 11_2$. Generally, an abbreviation will be used based on the fact that 32 bit IPv4 addresses with some number of first significant bits are traditionally written as e.g. 128.128.1.0/24 which stands for:

$B_{7,31}=10000000'10000000'00000001'00000000_2$, an address of which only the first bold 24 bits are significant. In addition, it will prove beneficial to define a length function in connection with a partition. Number of bits of the first n elements of a partition should be defined as:

$$\lambda(n) = \sum_{v=1}^{n} \theta_v.$$

An underlying structure for routing table 68 is a block of memory with $2^{(\theta x)}$ entries representing the decision needed for the forwarding step and a pointer to a possible next partition structure (herein after referred to as a "son" or "p-structure") of block size $2^{(\theta x+1)}$.

Figure 4:
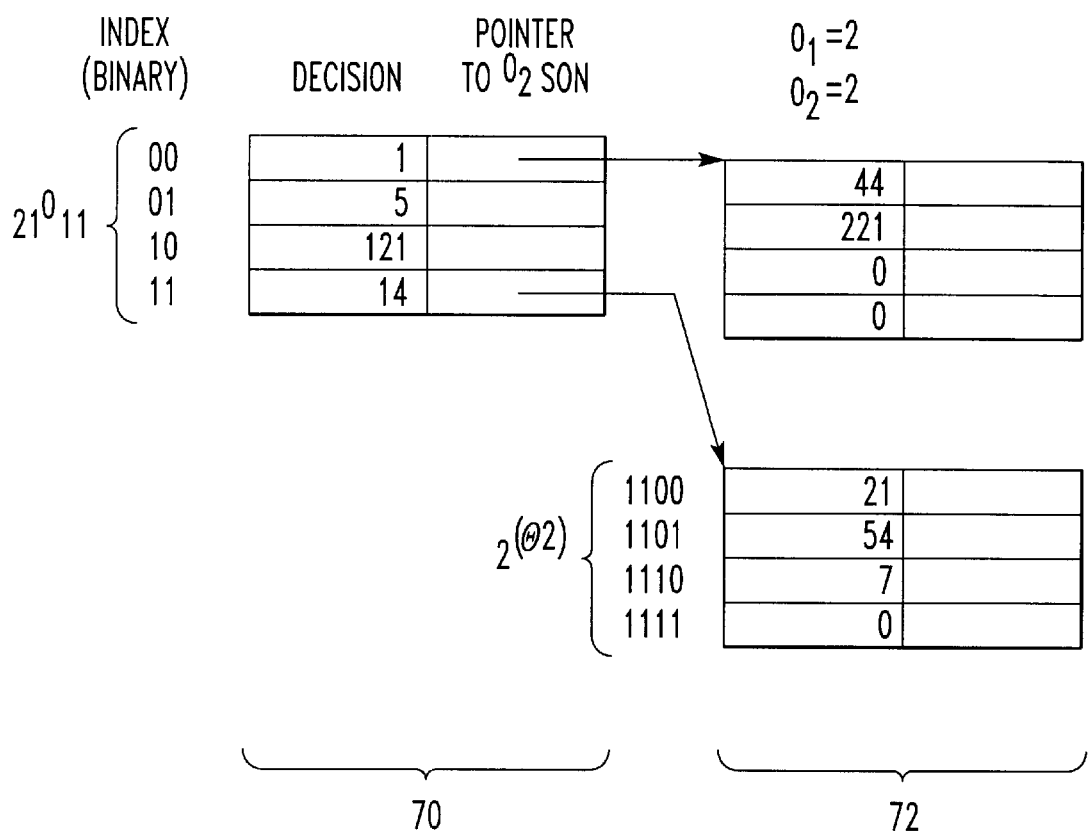
FIG. 4 is a diagram representing exemplary p-structures for a routing table.

FIG. 4 is a diagram representing exemplary p-structures for a routing table. FIG. 4 illustrates a set of p-structures 70 and 72 for a partition of $\{2,2\}$, which splits the address into two partitions of 2 bits each. Each p-structure is represented as an array having two parts, the first part containing forwarding information (hereinafter referred to as a "decision value"), and the second part containing a pointer to another p-structure or son if present ("p-structure pointer"). When a prefix B is inserted into the routing table, its decision value is written into the appropriate entry, and also into all entries of the p-structure indexed by the set $\hat{B}$. For example, for the binary index of "11", a decision value of "14" is listed for p-structure 70, with a p-structure pointer to p-structure 72. In turn, p-structure 72 has a decision value of "21" for binary index "1100", but since p-structure 72 has no sons, there is no p-structure pointer necessary for p-structure 72. Thus, when forwarding decision module 48 looks up an entire 32 bit address, it need only split the address into $|\Theta|$ parts by doing the necessary masking and shifting operations, and using the resulting numbers as indices into p-structures to obtain the decisions necessary. In essence, this structure increases the lookup speed at the price of management of a tree of p-structures and controlled memory waste.

Routing table constructing module 50 organizes, constructs, and maintains routing table 68 for forwarding device 40. Module 50 performs the construction of routing table 68 in conformance with the p-structure organizational principles discussed previously. In general, module 50 inserts an IPv4 prefix into an existing tree of p-structures which ultimately allows to set-up a forwarding table used by forwarding decision module 48 for longest match lookup of an IPv4 address in the existing tree of p-structures. This process is sometimes referred to as "populating" and "de-populating" the routing table. The process by which module 50 populates and de-populates routing table 68 is described with reference to FIGS. 5(a) and 5(b).

Figure 5A:
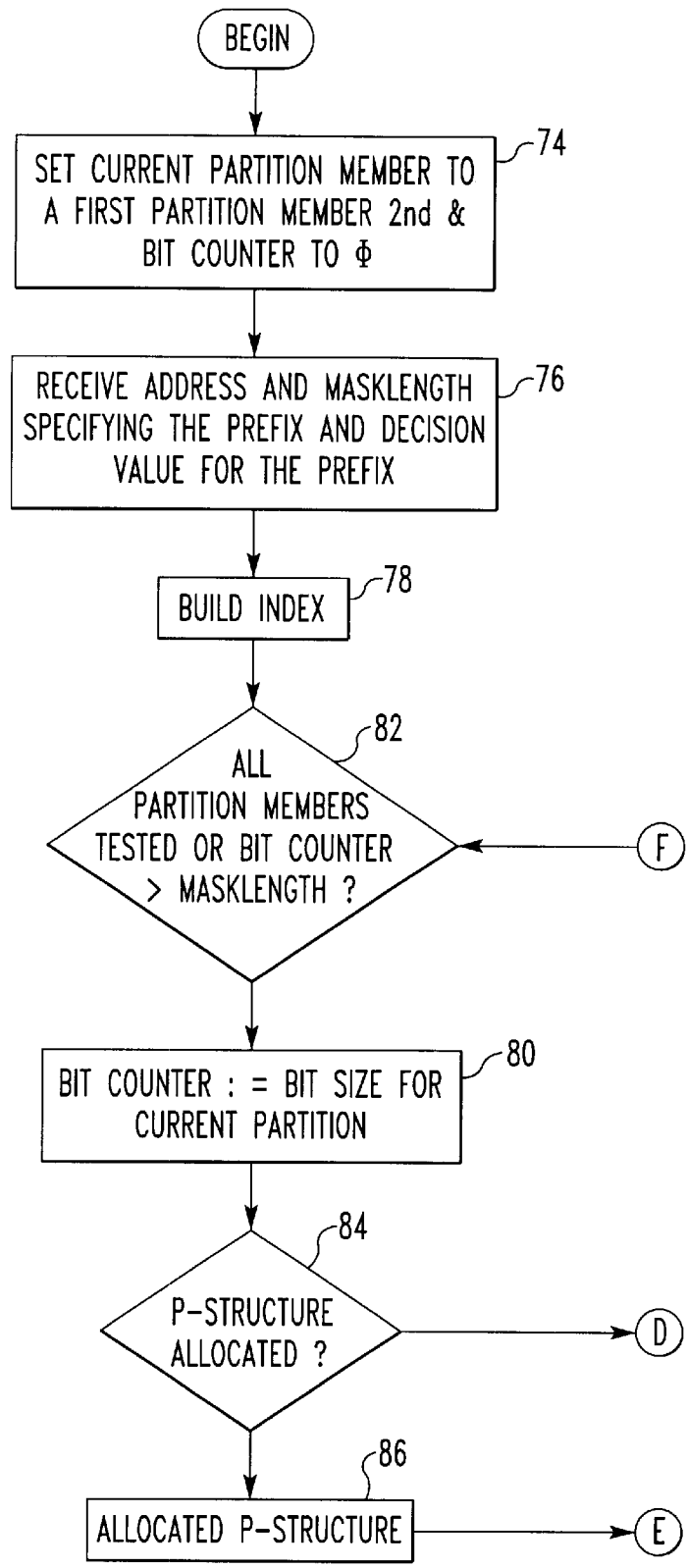
FIG. 5(a) is a first block flow diagram of steps for constructing a routing table in accordance with one embodiment of the invention.

FIG. 5(a) is a first block flow diagram of steps for constructing a routing table in accordance with one embodiment of the invention. At step 74 a current partition member is initialized to a first partition member, and a bit counter to zero. At step 76 a prefix and a decision value for the prefix are received. The prefix comprises an address and a masklength. At step 78 an index is built by masking the address using a mask associated with the current partition member.

Module 50 determines whether all partition members have been tested, or the bit counter is greater than the masklength, at step 82. If either condition is true at step 82, than control is passed back to step 74 to insert the next prefix, or alternatively, the algorithm ends. If both conditions are not true, however, control is passed to step 80. At step 80 the bit counter is set to a bit size for the current partition member. At step 84 module 50 determines if a current p-structure has been allocated for the current partition member. If not, then a current p-structure is allocated for the current partition member at step 86, and control passed to step 88 (as indicated by the letter "E"). If there has been a p-structure allocated at step 84, then control is passed directly to step 88 (as indicated by the letter "D").

Figure 5B:
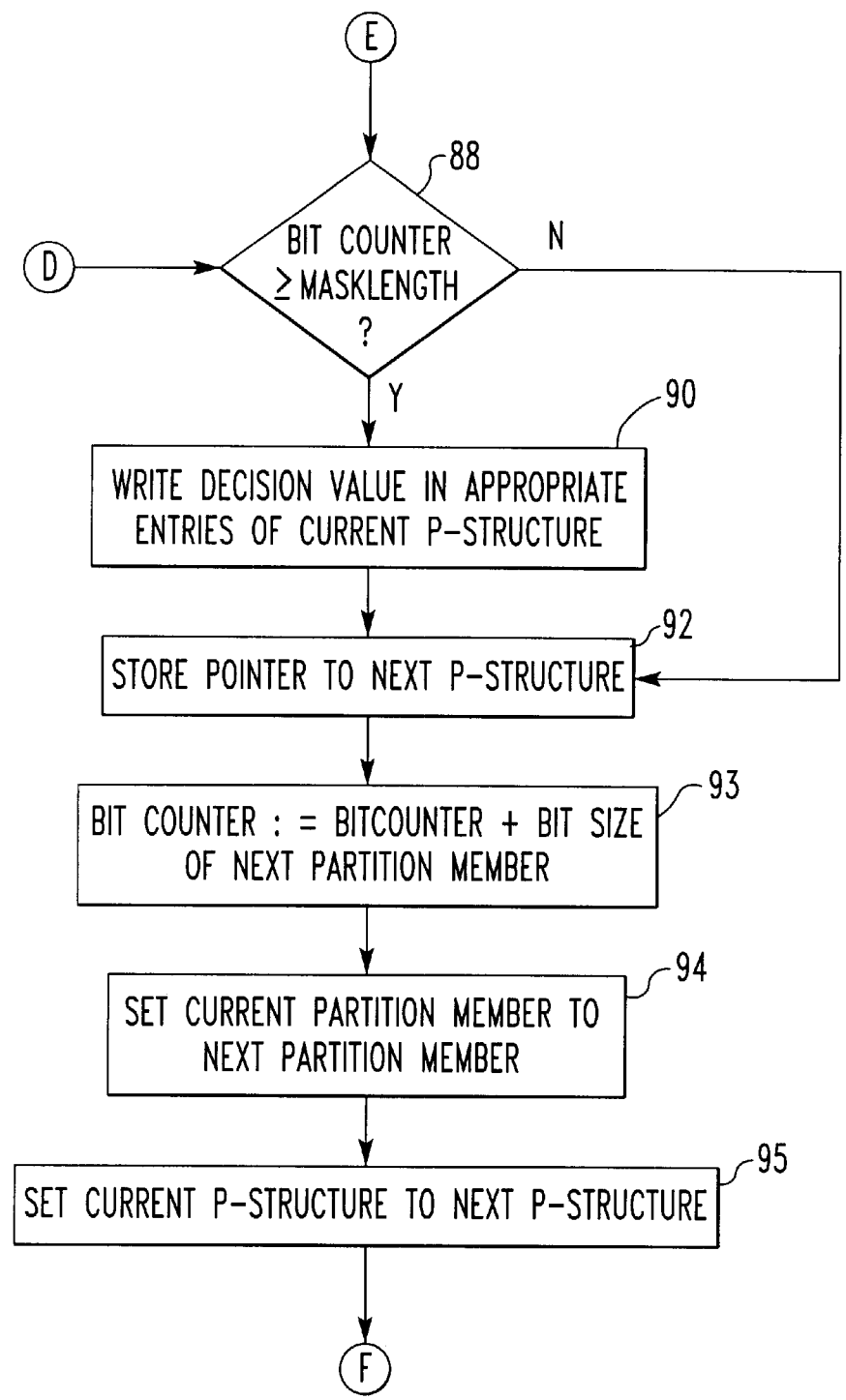
FIG. 5(b) is a second block flow diagram of steps for constructing a routing table in accordance with one embodiment of the invention.

FIG. 5(b) is a second block flow diagram of steps for constructing a routing table in accordance with one embodiment of the invention. Module 50 determines whether the bit counter is greater than or equal to the masklength at step 88. If true at step 88, then module 50 writes the decision value for all entries in the current p-structure corresponding to the bits given in the address, and all bit combinations for the length of the bit size for the current partition member at step 90 given that a decision value was not already stored by a previous longer prefix, and control is passed to step 92. If false at step 88, then control is passed to step 92. At step 92 module 50 stores a pointer to the next p-structure in the p-structure for the current partition member. At step 93 module 50 increments the bit counter by the bit size of the next partition member. At step 94 module 50 sets the current partition member to the next partition member. At step 95 module 50 sets the current p-structure to the next p-structure, and control is passed to step 82 (as indicated by the letter "F").

Figure 6:
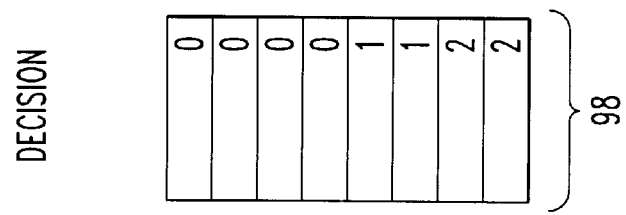
FIG. 6 is a diagram of an example for the population of a routing table in accordance with one embodiment of the present invention.
Figure 6:
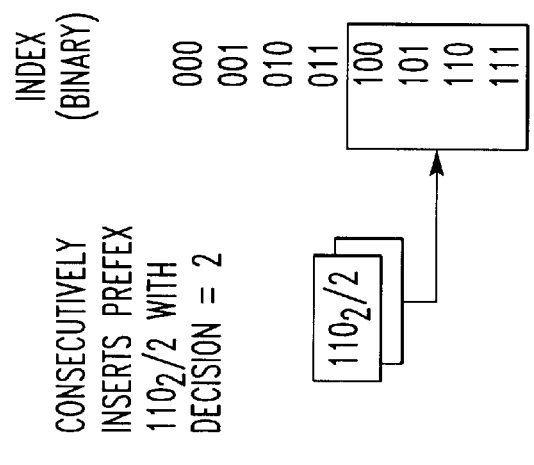
Figure 6:
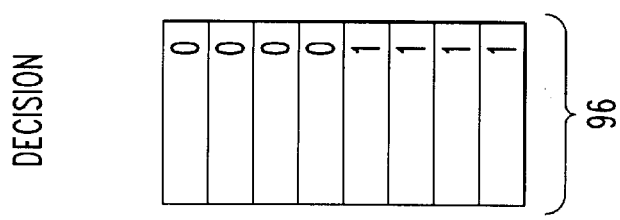
Figure 6:
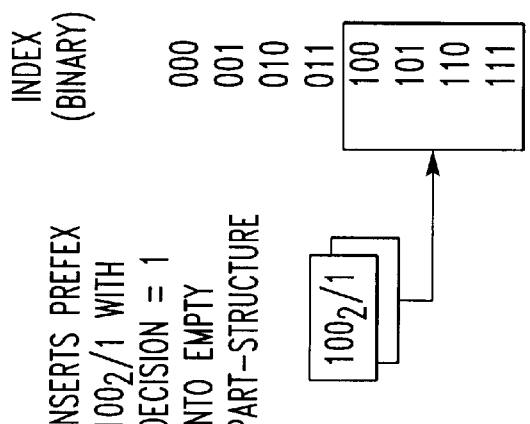

FIG. 6 is a diagram of an example for the population of a routing table in accordance with one embodiment of the present invention. As shown in FIG. 6, a 'first' p-structure has two prefixes, the second longer than the first and covering a part of the address-space the first one covered as well.

FIG. 6 is a logical representation for building a routing table in accordance with one embodiment of the invention. Assume that module 50 is constructing a routing table, and needs to insert prefixes $100_2/1$ and $110_2/2$ into the table. As shown in FIG. 6, module 50 inserts prefix $100_2/1$ with a decision value of 1 into a p-structure 96. Since only the first bit is meaningful for routing purposes, which in this case is a "1", the decision value 1 is inserted for all indices wherein the first bit equals "1". Afterwards, module 50 then inserts prefix $110_2/2$ with a decision value of 2 into p-structure 96, forming a new state for the p-structure referred to as p-structure 98. Since the first two bits are meaningful for routing purposes, which in this case is "11", the decision value 2 is inserted for all indices wherein the first two bits equals "11". To ensure the proper overwriting of the decision values for $100_2/1$, however, module 50 inserts the decision value for $110_2/2$ only in those indices which match the number of meaningful bits indicated for $110_2/2$, which are "110" and "111".

Forwarding decision module 48 performs the functionality for receiving a destination address for a packet and looking for forwarding information for the destination address in routing table 68 in conformance with the longest match rule. Forwarding decision module 48 assumes that routing table 68 has been constructed in accordance with the p-structure organizational principles discussed above. The process implemented by module 48 will be discussed in more detail with reference to FIGS. 7(a) and 7(b).

Figure 7A:
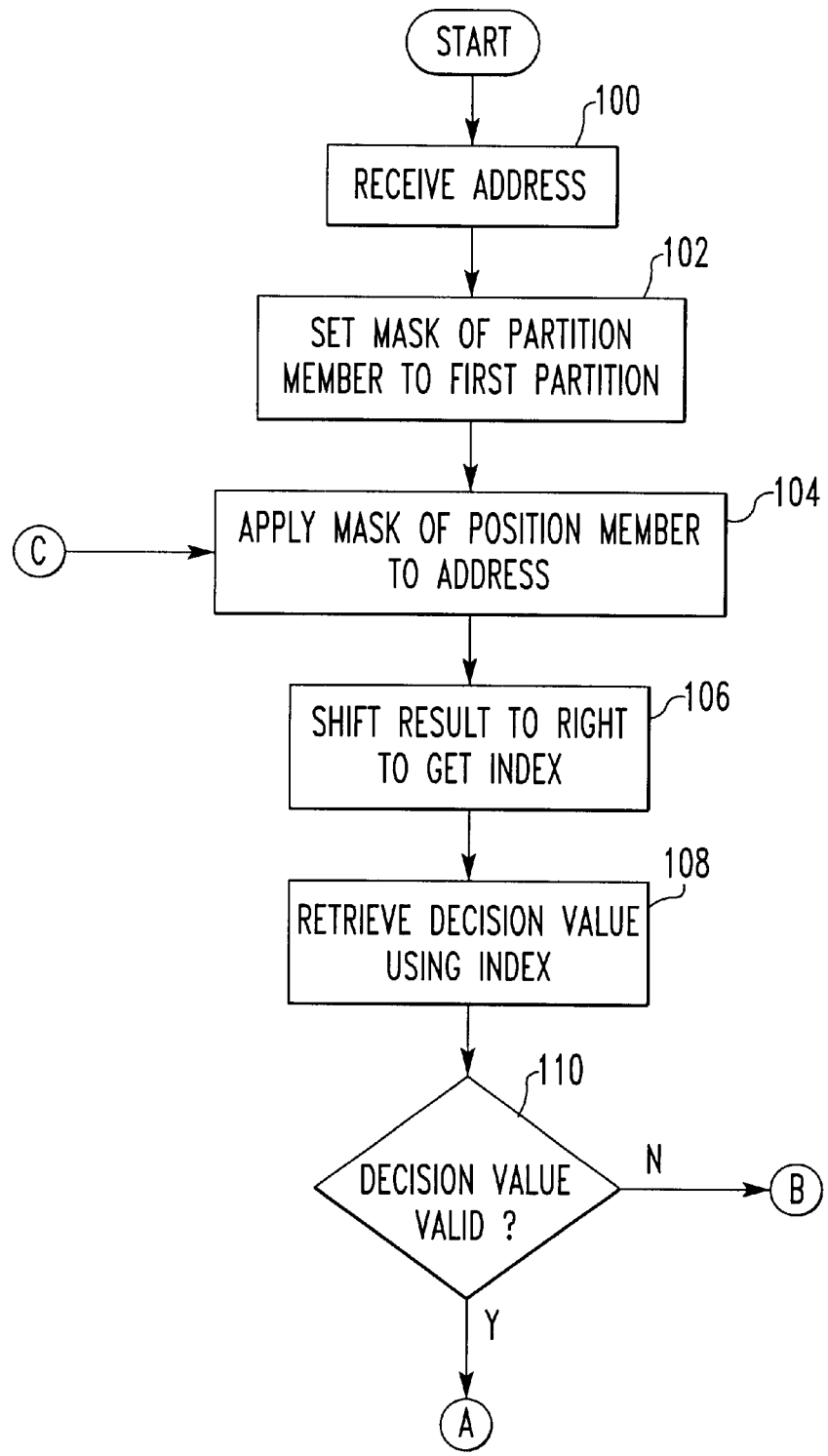
FIG. 7(a) is a first block flow diagram of steps performed by a forwarding decision module in accordance with one embodiment of the present invention.

FIG. 7(a) is a first block flow diagram of steps performed by a forwarding decision module in accordance with one embodiment of the present invention. Module 48 begins by receiving a destination address from a packet sent over network 18 at step 100. The mask for the current partition is set to the mask for the first partition at step 102. At step 104 the mask for the current partition is applied to the destination address using conventional techniques, which in this embodiment of the invention is a bit AND operation. The result of the mask is then shifted to the right a predetermined number of bits that is associated with the current partition at step 106. The shifted result becomes the index of the array holding a decision value for the address, and is used to retrieve the decision value at step 108. The decision value is then tested to determine whether it is a valid decision value at step 110. A valid decision value is a decision value which provides actual forwarding information for routing the packet.

Figure 7B:
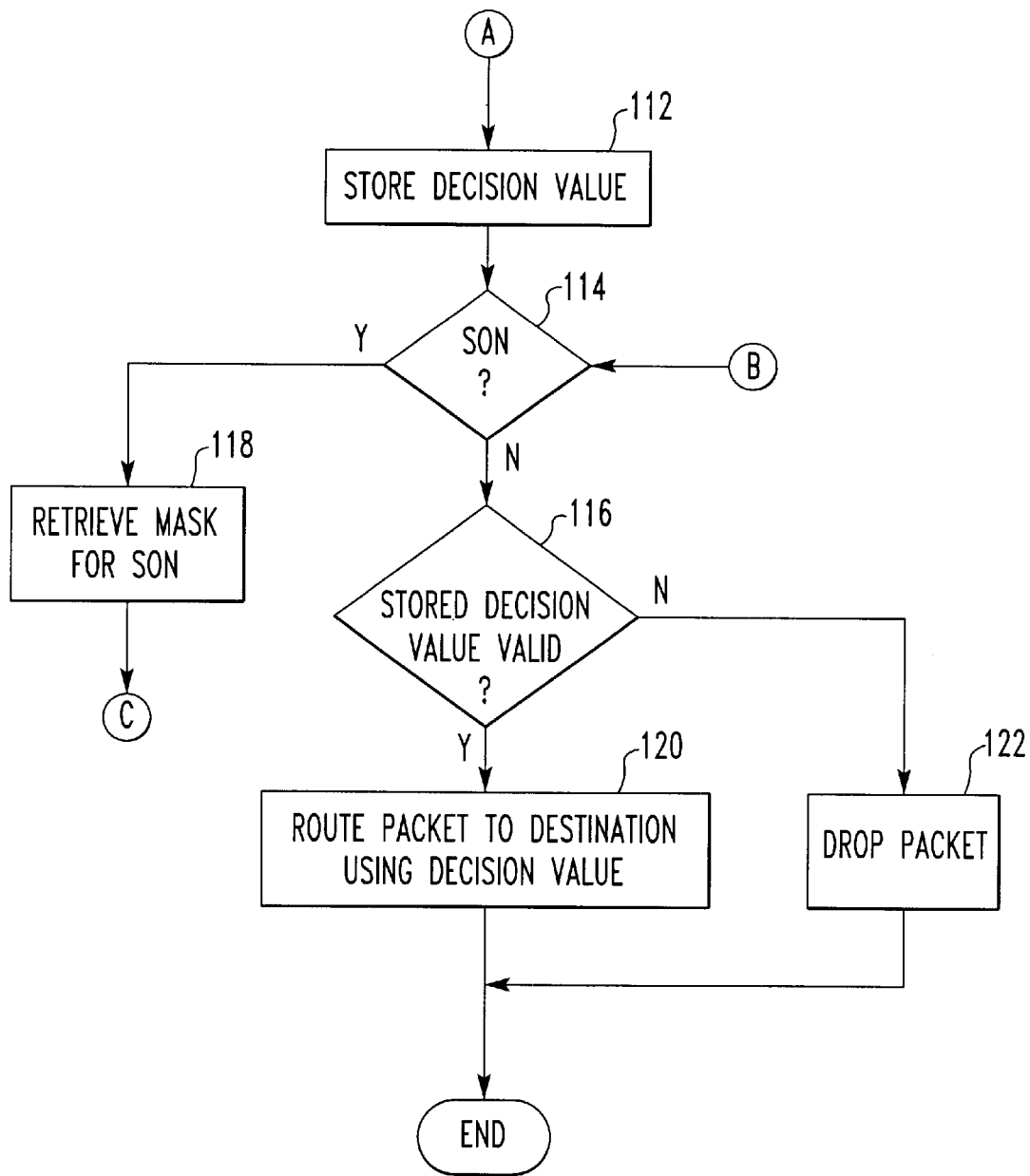
FIG. 7(b) is a second block flow diagram of steps performed by a forwarding decision module in accordance with one embodiment of the invention.

FIG. 7(b) is a second block flow diagram of steps performed by a forwarding decision module in accordance with one embodiment of the invention. If the decision value is valid at step 110, the decision value is stored at step 112 (as indicated by the letter "A"), and control is passed to step 114. If the decision value is not valid at step 110, then step 112 is bypassed and control is passed directly to step 114 (as indicated by the letter "B").

In addition to storing a decision value for the index, the array potentially stores a p-structure pointer for a son of the first p-structure. Thus, module 48 determines whether a son exists for the current index value at step 114. If there is a son at step 114, then the mask for the current partition is set to the mask for the second partition at step 118, and control is passed to step 104 (indicated by the letter "C"). Steps 104, 106, 108, 110, 112 and 114 are then repeated for the son. This continues for every son until there are no more sons determined at step 114.

If there is no son at step 114, then module 48 determines whether there is a valid decision value stored for the address at step 116. If there is a valid decision value stored at step 116, then the decision value is used to route the packet to its destination. If there is not a valid decision value stored at step 116, then the default setting for this condition is to drop the packet at step 122. It is worthy to note that this default condition can be modified to suit the desires of the network administrator or network designer, and still fall within the scope of the invention.

Figure 8:
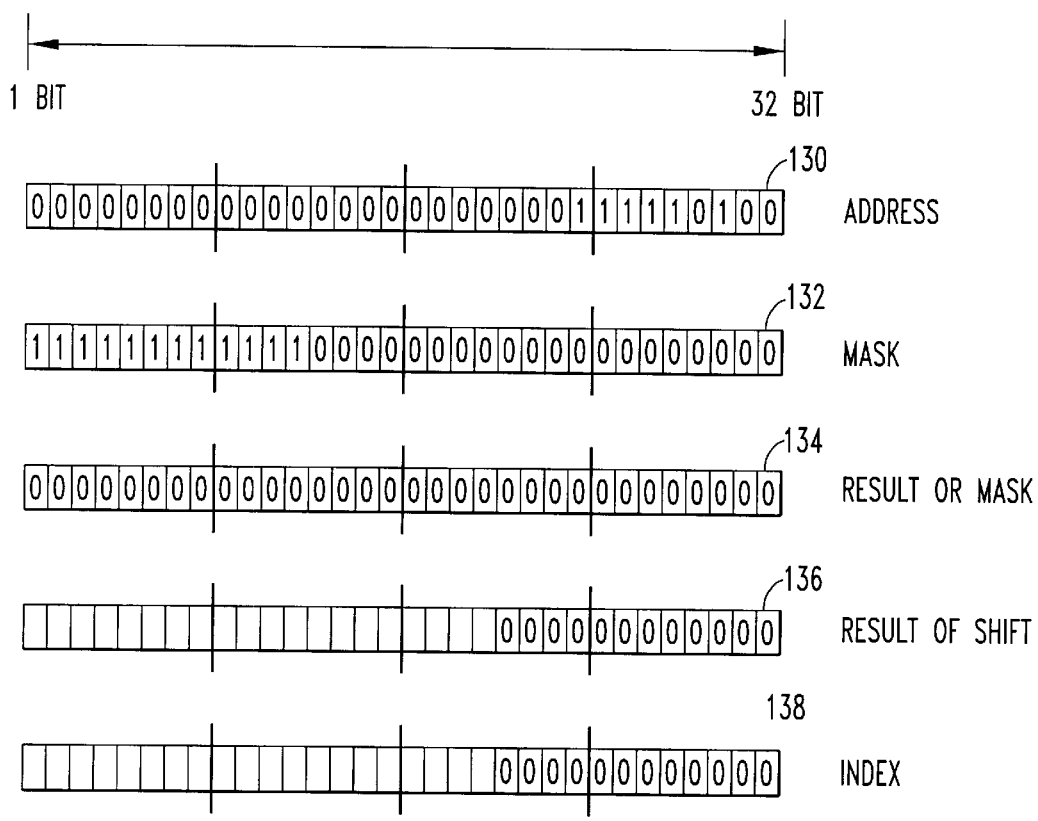
FIG. 8 is a diagram of a destination address converted to a p-structure index for a routing table in accordance with one embodiment of the present invention.

FIG. 8 is a diagram of a destination address converted to a p-structure index for a routing table in accordance with one embodiment of the present invention. Assume that the partition for routing table 68 is {12, 12, 8}. The precomputed mask and shift values for each partition member are shown in Table 1.

TABLE 1

| P-Member | Mask | Shift Value |
|---|---|---|
| 1st {12} | 11111111.11110000.00000000.00000000 | 20 |
| 2nd {12} | 00000000.00001111.11111111.00000000 | 8 |
| 3rd {8} | 00000000.00000000.00000000.11111111 | 0 |

Assume that a packet has a destination address represented in decimal of 0.0.1.2. The binary equivalent of IP address 0.0.1.2 is shown in block 130. Using the above precomputed masks and shift values shown in Table 1, the mask for the first partition member is retrieved at step 102 and is shown in block 132. The mask is then applied to the address shown in block 130 at step 104, and produces a masked address which is shown in block 134. The shift value associated with the first partition member is 20, as shown in Table 1. The masked address shown in block 134 is then shifted by 20, producing a shifted masked address that is shown in block 136. This shifted masked address is the index into the p-structure array for the first partition as shown in block 138.

If the index for the p-structure array indicates that there is a son for this index, then the above described process is continued for the second partition member. This process continues for each son utilizing the appropriate partition member, until there are no more sons remaining for the index value.

Figure 9:
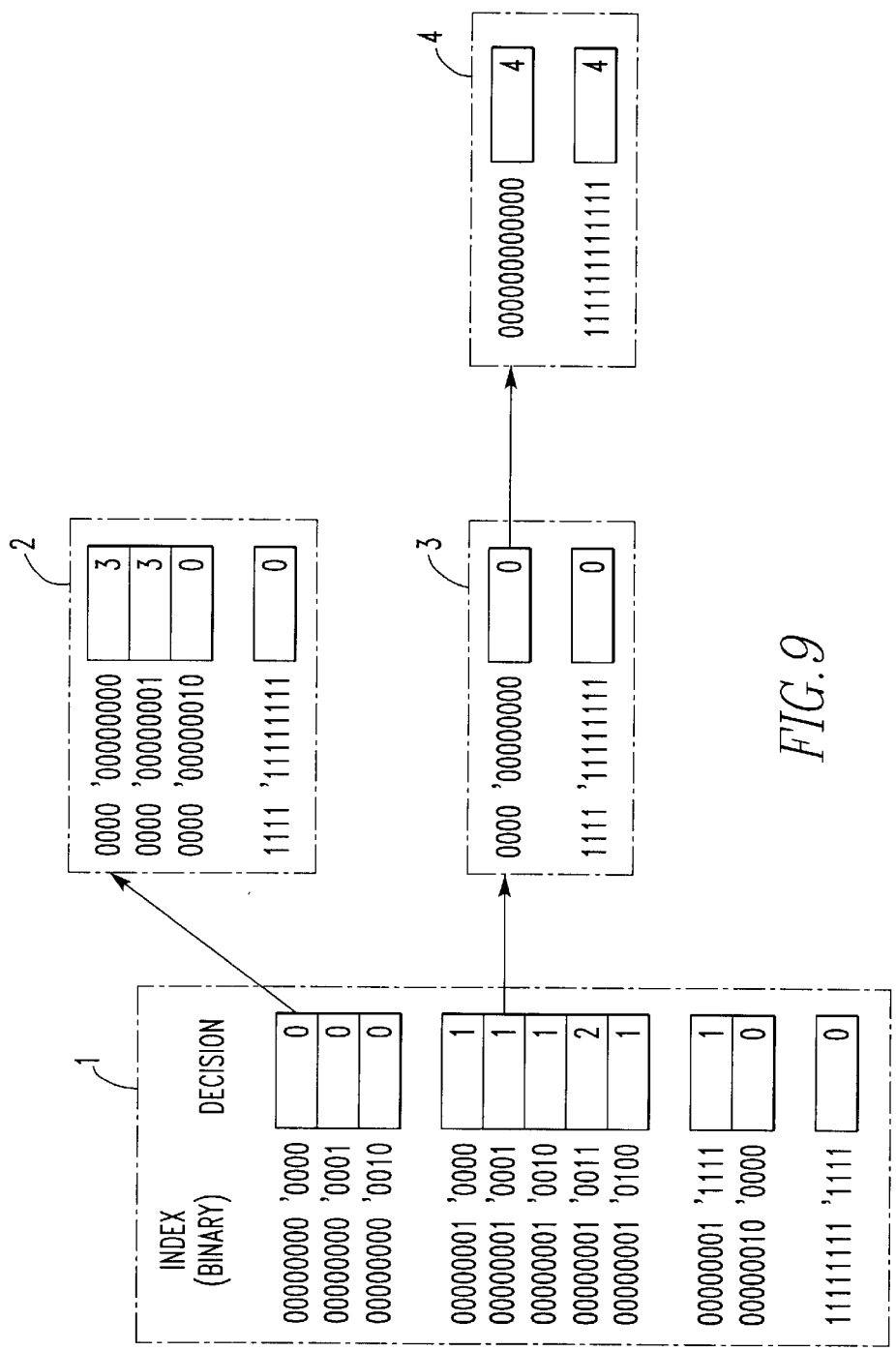
FIG. 9 is a diagram showing a second example of a routing table constructed in accordance with one embodiment of the present invention.

As can be appreciated from the example described above with reference to FIG. 8, the steps performed by module 48 are relatively few, and are optimized for the routing table constructed in accordance with the p-structure principles described above. As a result, the longest matching address for each packet can be retrieved extremely fast, and FIG. 9 is a diagram showing a second example of a routing table constructed in accordance with one embodiment of the present invention. The diagram shown in FIG. 9 will be helpful in describing a further example of the longest matching address algorithm performed by forwarding decision module 48. Sample destination addresses will be used to explain how module 48 operates therefore forwarding device 40 can process packets at a correspondingly high rate. It is estimated that forwarding device throughput can be increased using the principles of this embodiment of the invention on the order of two to eight times the throughput achievable by forwarding devices utilizing conventional longest match algorithms, depending on the particular implementation and whether the algorithms are performed in software or hardware. By utilizing techniques such as pipe-lining and parallel processing, it is possible to increase forwarding device throughput even more.

The following examples of the operation of this embodiment of the present invention will focus on an address lookup given a routing table (or tree) that is already initialized through the insertion of the necessary prefixes in accordance with partition principles described previously. The routing table is based on a partition of {12, 12, 8}, and its current state reflects executed insertion of the following prefixes:

1.0.0.0/8 or written in hexadecimal notation 1.0.0.0/8 with decision 1;

1.48.0.0/11 or written in hexadecimal notation 1.30.0.0/11 with decision 2;

0.0.0.0/23 or written in hexadecimal notation 0.0.0.0/23 with decision 3;

1.31.255.0/24 or written in hexadecimal notation 1.1F.FF.0/24 with decision 4.

It is worthy to note that the insertion of the last prefix creates a rather peculiar part of the tree, at first inspection it seems as if the decision should be written into the node corresponding to the second member of the partition since/24 is exactly $\lambda(2)$. The inventors of this embodiment of the invention, however, have recognized that the binary complement of this number is filled using this decision. As shown in FIG. 9, this binary complement is the node represented in level 3, ranging from 1.31.255.0 to 1.31.255.255 or in hexidecimal form 01.1F.FF.00 to 01.1F.FF.FF.

Each of the following examples will be described using the steps performed by forwarding decision module 48, as described with reference to FIGS. 7(a) and 7(b). Each example demonstrates a unique facet of the behavior of modules 48 and/or 50.

The first example destination address is 0.0.1.244. For address 0.0.1.244, module 48 will mask the value 0 into variable index, shift it by 20 bits to the right, and still holding 0 for index value access the entry in block 1. These steps were described before in more detail with reference to FIG. 8. This entry holds 0 as decision and points to node 2 as son. The next iteration of the loop will preserve the bold bits 00000000'00000000'00000001'00000000 of the address which are the bits 9 to 20 counted from the right. After shifting those bits 8 times to the right the resulting index of 1 will be used to access decision 3 in block 2. Since no son exists there, this is the best match.

The destination address for the second example is 1.0.0.0. Once the proper index is found using the steps described with reference to FIG. 8, the resulting index will in the first step match the decision 1 in the entry of block 1 indexed by bits 00000001'0000. Since no pointer to a son is present in this entry, this will be the best match as well.

The destination for the third example is 1.16.0.0. The resulting index will match decision 1 in the entry of block 1 indexed by bits 00000001'0001 and take the son pointer to block 3. The next iteration of the loop uses the bold bits 00000001'00010000'00000000'00000000 from the address and finds a decision 0 and no son pointer. Thus, decision 1 from the first iteration of the loop is the best match.

The destination address for the final example is 1.31.255.140. After the resulting index is determined, the first step takes decision 1 from block 1 and pursues the pointer to block 3. Here in the next iteration of the loop for a change the bold bits 00000001'00011111'11111111'00000000 are extracted, shifted 8 times to the right, and a pointer to block 4 is followed. In block 4 the remaining bold part of the address 1.31.255.140 is used to find the entry of interest which yields the decision 4 as the decision value. Since no son pointer is found, it is the best decision for this address.

The computer program instructions necessary to implement the functionality of modules 50 and 48 can be derived from the flow diagrams illustrated in FIGS. 5(a), 5(b), 7(a) and 7(b), and the following "pseudo-code". The pseudo-code notation utilizes syntax from the "MODULA-2" programming language, as well as several mathematical operators used to enhance the logical structure of the solution. The mathematical operators are defined as. follows:

|X| stands for the number of elements in set X.

$X_2$ stands for the binary notation of a number X.

In addition, 'C'-notation is used for bit-oriented manipulations of numbers as follows:

x&y stands for binary 'AND' operation between x and y.

x|y stands for binary 'OR' operation between x and y.

~x stands for binary complement of x.

x<<y stands for a shift of x to the left by y bits.

x>>y stands for a shift of x to the right by y bits.

To better understand the following pseudo-code, it may be helpful to define the following PASCAL or Modula-2 syntax:

ADDR (x) stands for address of a variable x.

x^ stands for de-reference of the address x or for the value of the variable x is pointing to.

Routing Table Construction Module Pseudo-Code
(* Declarations, Definitions and Initialization *)
TYPE IPAddress: INTEGER OF SET OF 0 . . 11111111'11111111'11111111'11111111$_2$;
TYPE IPMask: INTEGER OF SET OF $$\underbrace{0 \ldots 0}_{\alpha} \underbrace{1 \ldots 1}_{\beta} \underbrace{0 \ldots 0}_{32-\alpha-\beta}{}_2;$$

TYPE MaskLength: INTEGER OF SET OF 0. . 32;
TYPE pSTRUCTURE: STRUCTURE OF BEGIN
   son: POINTER TO mSTRUCTURE; (* next level *)
   decision: INTEGER; (* decision this structure holds*)
   END;
TYPE mSTRUCTURE: STRUCTURE OF BEGIN p1: pSTRUCTURE;

fatherbits: INTEGER; (* how many bits had the father that wrote this entry *) END;
TYPE mNode: ARRAY [0 . . ] OF mSTRUCTURE;
(* this is an open array that actually presents mSTRUCTUREs that can be indexed based on significant bits. The number of elements of the array will depend on the level at which this structure is implemented *)
(* The type mNode and mNodePtr will be intermingled in the code [much like in C] because they represent really the same thing, namely a pointer to the beginning of an array of varying number of elements. At different points, use of either type is more natural in the context of operations performed on it. *)
TYPE mNodePtr: POINTER TO mNode;
$\Theta$: ARRAY [1 . . n] OF INTEGER: $\{\theta_1$ to $\theta_n\}$;
Entries: ARRAY [1 . . |$\Theta$|]:=$\{2^{\theta_1}$ to $2^{\theta_n}\}$;
(* precomputed array of shifts & masks that have to be performed on the address for the partition given *)
AddrParts: ARRAY [1 . . |$\Theta$|] OF STRUCT BEGIN
    mask: IPMask;
    shifts: INTEGER; END;
TreeRoot: mNodePtr; (* root of the complete MR-Tree *)
CONSTANT
    NO_DECISION: INTEGER:=0;
(* no decision exists for this entry *)
CONSTANT
TREE_ENDED: INTEGER:=1;
(* tree ends here, no more memory to store further entries *)
CONSTANT
TREE_ON_ANOTHER_CPU: INTEGER:=2;
(* this part of the tree resides on another CPU *)
PROCEDURE Init ( )
(* first initialize the AddrParts which holds the information needed to determine which bits of the full address have to be masked out when looking at a member of the partition and how many down-shifts are needed to align first bit of the part masked right *)

```
DECLARATIONS
i,j: INTEGER;
shiftsum: INTEGER;
BEGIN
TreeRoot:=NULL;
shiftsum:= 32;
FOR i:=1 TO |Θ|
BEGIN
AddrParts[i].mask :=0;
FOR j:=1 TO θ_i
BEGIN
AddrParts[i].mask := AddrParts[i].mask <<1;
AddrParts[i].mask := AddrParts[i].mask | 1;
END;
AddrParts[i].shifts := shiftsum - θ_i;
shiftsum:= shiftsum - θ_i;
FOR j:=1 TO AddrParts[i].shifts
BEGIN
AddrParts[i].mask: = AddrParts[i].mask <<1;
END;
END;
END Init;
FUNCTION GetAddressPart( Address: IpAddress, masklength:
MaskLength, Part: 1. . |Θ| ) RETURNS IPAddress;
```

(* returns the requested part of the address shifted down so it can be used for an index *)

```
BEGIN
Address := Address & $\Sigma_{i:=1}^{masklength} 2^{32-i}$;
(* mask out insignificant bits *)
Address := Address & AddrParts[Part].mask;
Address := Address >> AddrParts[Part].shifts;
RETURN Address;
END GetAddressPart;
FUNCTION GetLevelBits( Part: 1. . |Θ| ) RETURNS INTEGER;
```

(* This function basically computes $\lambda$(Part) *)

```
DECLARATIONS
i,bits: INTEGER;
BEGIN
bits:=0;
FOR i:=1 TO Part
BEGIN
bits:= bits + Θ[i];
END;
RETURN bits;
END GetLevelBits;
PROCEDURE WriteEntries( BitsGiven: IpAddress,
BitsGivenLen:         MaskLength,
Node:                 mNodePtr,
Part:                 1. . |Θ|,
Decision:             INTEGER )
```

(* writes all entries in the level of the trie starting from index BitsGiven up to BitsGivenLen bits in the Node *)

```
DECLARATIONS
i,k: INTEGER;
BEGIN
k:= BitsGivenLen;
FOR i:=1 TO Part
BEGIN
k:= k-θ_i;
END;
k:= MIN(k, θ_part) ;
FOR i:= BitsGiven TO BitsGiven+$2^{\theta_{Part}-k}$
BEGIN
IF (Node[i].p.decision = NO_DECISION AND Decision
<> NO_DECISION ) OR
Node[i].fatherbits <= BitsGivenLen THEN
BEGIN
Node[i].p.decision:= Decision;
Node[i].fatherbits:= BitsGivenLen;
IF Decision = NO_DECISION THEN
BEGIN
Node[i].fatherbits:=0;
END;
END;
END;
END WriteEntries;
```

(* Insert a Prefix into Tree *)

```
FUNCTION NewNode( Level: 1. . |Θ| )
RETURNS mNodePtr;
BEGIN
RETURN "Contiguous Allocated Piece of Memory of
Entries [Level] mSTRUCTURES";
END NewNode;
PROCEDURE InsertIntoTree( Address: IpAddress,
masklength: MaskLength,
Decision: INTEGER
```

(* generate a new entry, Populate all 'descendants' in this level, even if a longer prefix for this particular one already exists. Consider prfx decision

| | |
|---|---|
| 000/3 | 1 |
| 001 | 0 |
| 010 | 0 |
| 011 | 0 | and inserting 00/2 with decision 2 causes

| | |
|---|---|
| 000/3 | 1 |
| 001 | 2 |
| 010 | 0 |
| 011 | 0 |

```
DECLARATIONS
Part:              1 . . |Θ|;
Bitsum:            INTEGER;
Fatherhop:         INTEGER;
Fatherbits:        MaskLength;
TreePtr:           POINTER TO mNodePtr;
newndx:            IpAddress;
BEGIN
Part:=1
Bitsum:=0;
Fatherhop:=NO_DECISION;
Fatherbits:=0;
TreePtr:= ADDR(TreeRoot);
WHILE Bitsum < masklength DO
BEGIN
newndx:= GetAddressPart (Address, masklength, Part);
IF TreePtr^ = NULL THEN
BEGIN
TreePtr^ := NewNode ( Part );
END;
IF Bitsum + Θ_part >= masklength THEN
BEGIN
WriteEntries( newndx, masklength, TreePtr^,
Part, Decision );
END;
Fatherhop:= TreePtr^[newndx].p.decision;
Fatherbits:= TreePtr^[newndx].fatherbits;
TreePtr:= ADDR(TreePtr^ [newndx].p.son );
Bitsum:= Bitsum + Θ_part;
Part:= Part+1;
END;
END InsertIntoTree;
```

Forwarding Decision Module Pseudo-Code
(* Longest Prefix Match for a 32 bit IPv4 Address *)

```
FUNCTION LookupAddress( Addr: IPAddress )
RETURNS INTEGER;
DECLARATIONS
BestSoFar:         INTEGER;
PartNr:            1 . . |Θ|;
Index:             INTEGER;
ActNode:           mNodePtr
Decision:          INTEGER;
Son:               mNodePtr;
BEGIN
BestSoFar:= NO_DECISION;
PartNr:= 1;
ActNode:= TreeRoot;
DO
Index:= Addr & AddrParts[PartNr].mask;
```

-continued

```
Index:= Index >> AddrParts[PartNr].shifts;
Decision:= ActNode [Index].decision;
Son:= ActNode[Index].son;
IF Decision <> NO_DECISION THEN
BEGIN
BestSoFar:= Decision;
END;
IF BestSoFar = TREE_ENDED OR
    BestSoFar = TREE_ON_ANOTHER_CPU THEN
BEGIN
```

(* abort here meaningfully based on the semantics of the decision *)

```
END;
PartNr:= PartNr+1 ;
ActNode:= Son;
WHILE ActNode <> NULL ;
RETURN BestSoFar;
END LookupAddress;
```

In another embodiment of the invention, module 50 performs maintenance of a routing table utilizing a separate "m-structure" coinciding with a "p-structure." As discussed previously, conventional maintenance techniques cannot update a routing table without preventing the forwarding device from utilizing the routing table. This is because conventional techniques read-lock those routing table entries that are currently being updated. This means that if a packet destination address requires the lookup of a routing table entry that is currently being updated, the packet will have to wait until the updating process is finished before being forwarded, or in the worst case scenario, be dropped from the network entirely.

This embodiment of the present invention overcomes the limitations of conventional maintenance techniques by maintaining separate maintenance structures ("m-structures") that conform to each p-structure for a routing table. The use of m-structures saves fast memory. Module 50 splits the m-structures and p-structures across two different types of memory. The insertion and deletion of prefixes are performed for each m-structure held in inexpensive memory as required by the network. On each access to the m-structure in inexpensive memory, a write-through into fast memory holding the p-structure tree is performed to keep both trees consistent. The write-through is accomplished using a dedicated or shared CPU/memory bus, and is therefore performed at a very high speed. Thus instead of locking out individual entries to the routing table as they are being updated as with conventional routing table maintenance techniques, this embodiment of the invention updates the routing table simultaneously, without locking the individual entities. This decreases the total update time interval, as well as minimizes the risk that a particular entry will be in the process of being updated when needed for routing a packet.

Thus, this embodiment of the present invention comprises a method and apparatus for updating a routing table comprised of p-structures utilized by a forwarding device. A maintenance routing table is built, the maintenance routing table having a m-structure corresponding to each p-structure for the routing table used by the forwarding device. An instruction is received to update the maintenance routing table by performing one of a group comprising adding, deleting and modifying a prefix. The maintenance routing table is then updated in accordance with said instruction, and replicated to the routing table used by the forwarding device.

The maintenance routing table is replicated to the forwarding device in several different manners. The maintenance routing table could be replicated to the forwarding device at predetermined intervals, such as once a day at a certain hour. Alternatively, the maintenance routing table could be replicated to the forwarding device whenever the maintenance routing table is updated. Finally, the maintenance routing table could be replicated to the forwarding device upon an actual request by the forwarding device.

In yet another embodiment of the invention, part of the routing table is used to build a p-structure tree in fast memory, making this approach similar to a cache. This would be appropriate for devices which do not implement enough fast memory to hold an entire p-structure tree. The decision points at which the tree is 'chopped off' are indicated using a special holding value, which is demonstrated in the pseudo-code definition using the constant named TREE_ENDED.

In a further embodiment of the invention, the performance of module 48 could be improved through the utilization of multiple processors. A value is stored in the decision field indicating that a part of the tree resides on another processor, operating in parallel. A p-structure tree is then split across multiple entities that execute the lookup algorithm performed by module 48, without any synchronization. The tree is divided across the processors and the division points marked with a constant such as the proposed TREE_ON_ANOTHER_CPU one. If partitioning of the tree occurs at the first member of address partition, each processor executes only one step of the lookup loop before realizing that another entity is holding the necessary information. Thus, the throughput of module 48 can be accelerated by utilizing the number of available processors, without incurring any overhead for synchronization.

Figure 10:
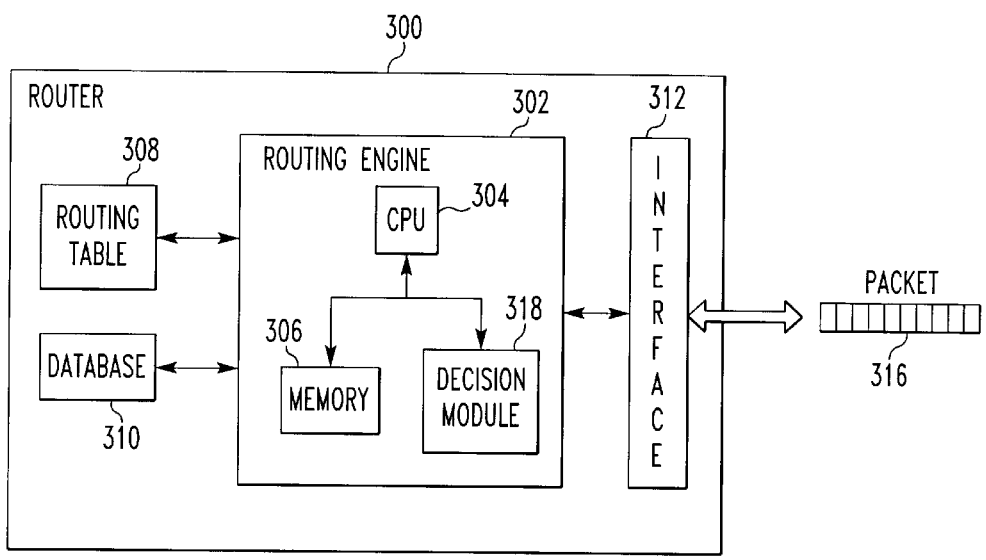
FIG. 10 illustrates a block diagram of a conventional router suitable for practicing another embodiment of the invention.

FIG. 10 illustrates a block diagram of a conventional router suitable for practicing another embodiment of the invention. Referring to FIG. 3, a router 300 includes a router engine 302 having a CPU 304, a memory device 306, and a forwarding decision module 318. Router engine 302 is coupled to various routing tables 308 and databases 310 capable of storing information necessary for router 300 to properly forward packets toward their destination. Databases 310 may include a Link State Database, a Path Database, a Tent Database, and a Forwarding Database. An interface 312 is coupled to router engine 302 and provides the physical connection to a network 18.

Although a single interface is shown in router 300, routers typically utilize multiple interfaces and a switching fabric to direct packets along the appropriate network link to reach its destination. A single interface is shown with router 300 to simplify router 300 for explanation purposes only. It can be appreciated that router design is well-known in the art, and that any router design implementing the functionality of the embodiments of the present invention falls within the scope of the invention.

Forwarding decision module 318 is used to perform longest address match lookups in routing tables 308. Forwarding decision module 318 performs similarly to forwarding decision module 48. Routing tables 308 are constructed and maintained utilizing the p-structure principles described for the various embodiments of the invention described above. In this embodiment of the invention, routing tables 308 are constructed and maintained by a routing table constructing module (not shown) that performs substantially as routing table constructing module 50. Further, this routing table constructing module can be either located locally with router 300, or remotely from router 300. In this embodiment of the invention, the routing table constructing module is located at a central server governed by an Internet Service Provider (ISP). The server version of the routing table constructing module is used to construct and maintain routing tables 308 for router 300. In addition, the server version can be used to construct and maintain routing tables for any number of routers connected by network links to the ISP server. This embodiment of the invention would reduce hardware and software costs associated with each individual router or forwarding device, and facilitate routing table populating and de-populating by sending address and route updates to a central ISP server.

Although various embodiments of the invention are specifically illustrated and described herein, it will be appreciated that modifications and variations of the present invention are covered by the above teachings and within the purview of the appended claims without departing from the spirit and intended scope of the claims. For example, although the implementation of the above-described p-structure principles is described in terms of software and specific program code segments, the various embodiments of the invention could also be implemented in hardware and still fall within the scope of the invention. In another example, although the various embodiments of the invention could be implemented by a general purpose computer, such as described with reference to FIG. 3, it can be appreciated that these embodiments could be implemented as part of a dedicated device, such as described with reference to FIG. 10, and still fall within the scope of the invention.

What is claimed is:

1. A method for forwarding packets, comprising the steps of:
   a) receiving an address for a packet;
   matching said address with a longest prefix stored in a routing table constructed using p-structures, wherein each p-structure is represented as an array having a first part and a second part, the first part containing forwarding information for the packet called a decision value, and the second part containing a pointer to another p-structure by:
   a) initializing a current partition member to a first partition member;
   b) translating said address into a p-structure index utilizing partition information stored for said current partition member;
   c) storing a decision value associated with said index;
   d) determining whether a pointer is associated with said index;
   e) setting said current partition member to a next partition member associated with said pointer if there is a pointer associated with said index;
   f) repeating steps b) to e) until there is no pointer associated with said index;
   retrieving the decision value associated with said longest prefix; and
   forwarding said packet in according with said decision value.

2. The method of claim 1, wherein said step of translating comprises the steps of:
   storing said address in a register;
   retrieving a mask associated with said current partition member;
   masking said address with said partition mask; and
   shifting said masked address to the right in accordance with a shift value associated with said current partition member.

3. A method for constructing a routing table, comprising the steps of:
   receiving a prefix and a decision value associated with said prefix, wherein said prefix is a bit sequence for a binary number $$B_{a,\beta} = b_\beta b_{\beta-1} \ldots b_a \ldots b_0 = \sum_{n=a}^{\beta} b_n * 2^n = b_\beta \ldots b_a \underbrace{00 \ldots 0}_{a};$$

and
   inserting said decision value into all entries of at least one p-structure indexed by the set $\hat{B}_a := \{\lambda \in N : \lambda < 2^a \wedge \lambda \geq 0\}$, where B, b, a and β are positive integers, and wherein each p-structure is represented as an array having a first part and a second part, the first part containing forwarding information for the packet defining the decision value, and the second part containing a pointer to another p-structure.

4. A method for constructing a routing table, comprising the steps of:
   a) setting a current partition member to a first partition member, and a bit counter to a bit size for said first partition member;
   b) receiving a prefix and a decision value associated with said prefix, said prefix comprising an address and a masklength;
   c) translating said address into an index for said current partition member, and a subaddress of said masklength;
   d) comparing said masklength to said bit counter to form a comparison;
   e) inserting said decision value for all entries in a p-structure corresponding to said subaddress, and all bit combinations for bits more significant than the bits for subaddress and less significant for said bit size for the current partition member in accordance with said comparison;
   f) setting said current partition member to a next partition member in accordance with said comparison;
   g) incrementing said bit counter by adding a bit size for said next partition member to said bit counter; and
   h) repeating steps c) to g) until there are no more partition members or bit counter becomes greater than the masklength.

5. The method of claim 4, wherein said step of translating said address into an index for said current partition member comprises the steps of:
   storing said address in a register;
   retrieving a mask associated with said current partition member;
   masking said address with said partition mask; and
   shifting said masked address to the right in accordance with a shift value associated with said current partition member.

6. The method of claim 4, wherein said step of translating said address into a subaddress of said masklength comprises the steps of:
   storing said address in a register;
   retrieving a mask associated with said prefix;
   masking said address with said mask; and
      shifting said masked address to the right in accordance with a shift value associated with said prefix.

7. A method for updating a routing table comprised of p-structures utilized by a forwarding device, comprising the steps of:
   building a maintenance routing table having a m-structure corresponding to each p-structure for the routing table, wherein each p-structure is represented as an array having a first part and a second part, the first part containing forwarding information for the packet called a decision value, and the second part containing a pointer to another p-structure;
   receiving an instruction to update said maintenance routing table by performing one of a group comprising adding, deleting and modifying a prefix;
   updating said maintenance routing table in accordance with said instruction; and
   replicating said maintenance routing table to said routing table used by the forwarding device.

8. The method of claim 7, wherein said step of replicating replicates said maintenance routing table to the forwarding device at predetermined intervals.

9. The method of claim 7, wherein said step of replicating replicates said maintenance routing table to the forwarding device whenever said maintenance routing table is updated.

10. The method of claim 7, wherein said step of replicating replicates said maintenance routing table to the forwarding device upon a request by the forwarding device.

11. A method for forwarding packets, comprising the steps of:
   constructing a routing table utilizing p-structures, wherein each p-structure is represented as an array having a first part and a second part, the first part containing forwarding information for the packet called a decision value, and the second part containing a pointer to another p-structure;
   receiving an address for a packet;
   matching said address with a longest prefix stored in said routing table by identifying an associated first p-structure and receiving each subsequent p-structure that a pointer of a previous p-structure points to until a last p-structure having a decision value but no pointer is arrived at;
   retrieving the decision value from the last p-structure associated with said longest prefix; and
   forwarding said packet in accordance with said decision value.

12. An apparatus for forwarding packets, comprising:
   means for receiving an address for a packet;
   means for matching said address with a longest prefix stored in a routing table constructed using p-structures, wherein each p-structure is represented as an array having a first part and a second part, the first part containing forwarding information for the packet called a decision value, and the second part containing a pointer to another p-structure, said matching means comprising:
   a) means for initializing a current partition member to a first partition member;
   b) means for translating said address into a p-structure index utilizing partition information stored for said current partition member;
   c) means for storing a decision value associated with said index;
   d) means for determining whether a pointer is associated with said index;
   e) means for setting said current partition member to a next partition member associated with said pointer if there is a pointer associated with said index;
   g) means for utilizing means b) to e) until there is no pointer associated with said index;

means for retrieving a decision value associated with said longest prefix; and means for forwarding said packet in accordance with said decision value.

13. The apparatus of claim 12, wherein said means for translating comprises:

means for storing said address in a register;

means for retrieving a mask associated with said current partition member;

means for masking said address with said partition mask; and means for shifting said masked address to the right in accordance with a shift value associated with said current partition member.

14. An apparatus for constructing a routing table, comprising:

means for receiving a prefix and a decision value associated with said prefix, wherein said prefix is defined as a bit sequence for a binary number $$B_{a,\beta} = b_\beta b_{\beta-1} \ldots b_a \ldots b_0 = \sum_{n=a}^{\beta} b_n * 2^n = b_\beta \ldots b_a \underbrace{00 \ldots 0}_{a};$$

and means for inserting said decision value into all entries of at least one p-structure indexed by the set $\hat{B}_a := \{\lambda \in N : \lambda < 2^{a^*} \lambda \geqq 0\}$, where B, b, a and β are positive integers, and wherein each p-structure is represented as an array having a first part and a second part, the first part containing forwarding information for the packet defining the decision value, and the second part containing a pointer to another p-structure.

15. An apparatus for constructing a routing table, comprising:

a) means for setting a current partition member to a first partition member, and a bit counter to a bit size for said first partition member;

b) means for receiving a prefix and a decision value associated with said prefix, said prefix comprising an address and a masklength;

c) means for translating said address into an index for said current partition member, and a subaddress of said masklength;

d) means for comparing said masklength to said bit counter to form a comparison;

e) means for inserting said decision value for all entries in a p-structure corresponding to said subaddress, and all bit combinations for bits more significant than the bits for subaddress and less significant for said bit size for the current partition member in accordance with said comparison;

f) means for setting said current partition member to a next partition member in accordance with said comparison;

g) means for incrementing said bit counter by adding a bit size for said next partition member to said bit counter; and h) means for utilizing means c) to g) until there are no more partition members or bit counter becomes greater than the masklength.

16. The apparatus of claim 15, wherein said means for translating said address into an index for said current partition member comprises:

means for storing said address in a register;

means for retrieving a mask associated with said current partition member;

means for masking said address with said partition mask; and means for shifting said masked address to the right in accordance with a shift value associated with said current partition member.

17. The apparatus of claim 15, wherein said means for translating said address into a subaddress of said masklength comprises:

means for storing said address in a register;

means for retrieving a mask associated with said prefix;

means for masking said address with said mask; and means for shifting said masked address to the right in accordance with a shift value associated with said prefix.

18. An apparatus for updating a routing table comprised of p-structures utilized by a forwarding device, comprising:

means for building a maintenance routing table having a m-structure corresponding to each p-structure for the routing table, wherein each p-structure is represented as an array having a first part and a second part, the first part containing forwarding information for the packet called a decision value, and the second part containing a pointer to another p-structure;

means for receiving an instruction to update said maintenance routing table by performing one of a group comprising adding, deleting and modifying a prefix;

means for updating said maintenance routing table in accordance with said instruction; and means for replicating said maintenance routing table to said routing table used by the forwarding device.

19. The apparatus of claim 18, wherein said means for replicating replicates said maintenance routing table to the forwarding device at predetermined intervals.

20. The apparatus of claim 18, wherein said means for replicating replicates said maintenance routing table to the forwarding device whenever said maintenance routing table is updated.

21. The apparatus of claim 18, wherein said means for replicating replicates said maintenance routing table to the forwarding device upon a request by the forwarding device.

22. An apparatus for forwarding packets, comprising:

means for constructing a routing table utilizing p-structures, wherein each p-structure is represented as an array having a first part and a second part, the first part containing forwarding information for the packet called a decision value, and the second part containing a pointer to another p-structure;

means for receiving an address for a packet;

means for matching said address with a longest prefix stored in said routing table by identifying an associated first p-structure and receiving each subsequent p-structure that a pointer of a previous p-structure points to until a last p-structure having a decision value but no pointer is arrived at;

means for retrieving the decision value from the last p-structure associated with said longest prefix; and means for forwarding said packet in accordance with said decision value.

23. A computer for forwarding packets, comprising:

a memory containing a forwarding decision program having functions for matching an address for a packet with a longest prefix stored in a routing table constructed using p-structures, wherein each p-structure is represented as an array having a first part and a second part, the first part containing forwarding information for the packet called a decision value, and the second part containing a pointer to another p-structure by identifying an associated first p-structure and receiving each subsequent p-structure that a pointer of a previous p-structure points to until a last p-structure having a decision value but no pointer is arrived at, and forwarding said packet using the decision value from the last p-structure associated with said prefix; and a processor for executing the forwarding decision program.

24. A computer for forwarding packets, comprising:

a memory containing a routing table constructing program having functions for constructing a routing table using p-structures, wherein each p-structure is represented as an array having a first part and a second part, the first part containing forwarding information for the packet called a decision value, and the second part containing a pointer to another p-structure with at least three p-structures linked together by pointers; and a processor for executing the routing table constructing program.

25. A computer readable medium whose contents cause a computer system to forward a packet, the computer system having a forwarding decision program with functions for forwarding, by performing the steps of:

receiving an address for a packet;

matching said address with a longest prefix stored in a routing table constructed using p-structures, wherein each p-structure is represented as an array having a first part and a second part, the first part containing forwarding information for the packet called a decision value, and the second part containing a pointer to another p-structure by:

a) initializing a current partition member to a first partition member;

b) translating said address into a p-structure index utilizing partition information stored for said current partition member;

c) storing a decision value associated with said index;

d) determining whether a pointer is associated with said index;

e) setting said current partition member to a next partition member associated with said pointer if there is a pointer associated with said index;

f) repeating steps b) to e) until there is no pointer associated with said index;

retrieving a decision value associated with said longest prefix; and forwarding said packet in accordance with said decision value.

26. The computer readable medium of claim 25, wherein said step of translating comprises the steps of:

storing said address in a register;

retrieving a mask associated with said current partition member;

masking said address with said partition mask; and shifting said masked address to the right in accordance with a shift value associated with said current partition member.

27. A computer readable medium whose contents cause a computer system to construct a routing table, the computer system having a routing table constructing program with functions for constructing, by performing the steps of:

a) setting a current partition member to a first partition member, and a bit counter to a bit size for said first partition member;

b) receiving a prefix and a decision value associated with said prefix, said prefix comprising an address and a masklength;

c) translating said address into an index for said current partition member, and a subaddress of said masklength;

d) comparing said masklength to said bit counter to form a comparison;

e) inserting said decision value for all entries in a p-structure corresponding to said subaddress, and all bit combinations for bits more significant than the bits for subaddress and less significant for said bit size for the current partition member in accordance with said comparison;

f) setting said current partition member to a next partition member in accordance with said comparison;

g) incrementing said bit counter by adding a bit size for said next partition member to said bit counter;

h) repeating steps c) to g) until there are no more partition members or bit counter becomes greater than the masklength.

28. The computer readable medium of claim 27, wherein said step of translating said address into an index for said current partition member comprises the steps of:

storing said address in a register;

retrieving a mask associated with said current partition member;

masking said address with said partition mask; and shifting said masked address to the right in accordance with a shift value associated with said current partition member.

29. The computer readable medium of claim 27, wherein said step of translating said address into a subaddress of said masklength comprises the steps of:

storing said address in a register;

retrieving a mask associated with said prefix;

masking said address with said mask; and shifting said masked address to the right in accordance with a shift value associated with said prefix.

30. A method for locating a decision value, comprising the steps of:

receiving an address for a packet;

matching said address with a longest prefix stored in a table constructed using p-structures, wherein each p-structure is represented as an array having a first part and a second part, the first part containing forwarding information for the packet called a decision value, and the second part containing a pointer to another p-structure by:

a) initializing a current partition member to a first partition member;

b) translating said address into a p-structure index utilizing partition information stored for said current partition member;

c) storing a decision value associated with said index;

d) determining whether a pointer is associated with said index;

e) setting said current partition member to a next partition member associated with said pointer if there is a pointer associated with said index;

f) repeating steps b) to e) until there is no pointer associated with said index; and retrieving the decision value associated with said longest prefix.

31. The method of claim 30, wherein said step of translating comprises the steps of:
   storing said address in a register;
   retrieving a mask associated with said current partition member;
   masking said address with said partition mask; and
   shifting said masked address to the right in accordance with a shift value associated with said current partition member.

32. An apparatus for locating a decision value, comprising the steps of:
   means for receiving an address for a packet;
   means for matching said address with a longest prefix stored in a table constructed using p-structures, wherein each p-structure is represented as an array having a first part and a second part, the first part containing forwarding information for the packet called a decision value, and the second part containing a pointer to another p-structure, said matching means comprising:
   a) means for initializing a current partition member to a first partition member;
   b) means for translating said address into a p-structure index utilizing partition information stored for said current partition member;
   c) means for storing a decision value associated with said index;
   d) means for determining whether a pointer is associated with said index;
   e) means for setting said current partition member to a next partition member associated with said pointer if there is a pointer associated with said index;
   f) means for utilizing means b) to e) until there is no pointer associated with said index; and
   means for retrieving the decision value associated with said longest prefix.

33. The apparatus of claim 32, wherein said means for translating comprises:
   means for storing said address in a register;
   means for retrieving a mask associated with said current partition member;
   means for masking said address with said partition mask; and
   means for shifting said masked address to the right in accordance with a shift value associated with said current partition member.

34. A computer readable medium whose contents cause a computer system to locate a decision value in a routing table, the computer system having a forwarding decision program with functions for locating, by performing the steps of:
   receiving an address for a packet;
   matching said address with a longest prefix stored in a routing table constructed using p-structures, wherein each p-structure is represented as an array having a first part and a second part, the first part containing forwarding information for the packet called a decision value, and the second part containing a pointer to another p-structure by:
   a) initializing a current partition member to a first partition member;
   b) translating said address into a p-structure index utilizing partition information stored for said current partition member;
   c) storing a decision value associated with said index;
   d) determining whether a pointer is associated with said index;
   e) setting said current partition member to a next partition member associated with said pointer if there is a pointer associated with said index;
   f) repeating steps b) to e) until there is no pointer associated with said index; and
   retrieving the decision value associated with said longest prefix.

35. The computer readable medium of claim 34, wherein said step of translating comprises the steps of:
   storing said address in a register;
   retrieving a mask associated with said current partition member;
   masking said address with said partition mask; and
   shifting said masked address to the right in accordance with a shift value associated with said current partition member.

36. A computer for locating a decision value, comprising:
   a memory containing a forwarding decision program having functions for matching an address for a packet with a longest prefix stored in a table constructed using p-structures, wherein each p-structure is represented as an array having a first part and a second part, the first part containing forwarding information for the packet called a decision value, and the second part containing a pointer to another p-structure by identifying an associated first p-structure and receiving each subsequent p-structure that a pointer of a previous p-structure points to until a last p-structure having a decision value but no pointer is arrived at, and locating the decision value from the last p-structure associated with said prefix; and
   a processor for executing the forwarding decision program.

37. A look up device, comprising:
   a processor;
   a memory coupled to said processor, said memory containing a table of prefixes and decision values organized into p-structures, wherein each p-structure is represented as an array having a first part and a second part, the first part containing forwarding information for the packet called a decision value, and the second part containing a pointer to another p-structure; and
   a forwarding decision module coupled to said processor and said memory, said forwarding decision module matching said address with a longest prefix stored in said table by identifying an associated first p-structure and receiving each subsequent p-structure that a pointer of a previous p-structure points to until a last p-structure having a decision value but no pointer is arrived at and locating the decision value from the last p-structure associated with said prefix.

38. A routing table constructing device, comprising:
   a processor;
   a memory coupled to said processor;
   a routing table constructing module coupled to said processor and said memory, said routing table constructing module constructing a table of prefixes and decision values organized into p-structures and storing said table into said memory, wherein each p-structure is represented as an array having a first part and a second part, the first part containing forwarding information for the packet called a decision value, and the second part containing a pointer to another p-structure.

39. The device of claim 38, further comprising a table maintenance module coupled to said processor and memory, said table maintenance module building a maintenance routing table having a m-structure corresponding to each p-structure for said table, updating said maintenance routing table, and replicating said maintenance routing table to said table.

40. A computer for locating a decision value, comprising:
a cache memory containing a table comprised of prefixes and decision values organized as a p-structure tree, wherein each p-structure is represented as an array having a first part and a second part, the first part containing forwarding information for the packet called a decision value, and the second part containing a pointer to another p-structure, with a holding value used to mark decision points for that portion of said tree that does not fit within said cache memory;
a memory containing a forwarding decision program having functions for matching an address for a packet with a longest prefix stored in said table by identifying an associated first p-structure and receiving each subsequent p-structure that a pointer of a previous p-structure points to until a last p-structure having a decision value but no pointer is arrived at and locating the decision value from the last p-structure associated with said prefix; and
a processor for executing the forwarding decision program.

41. A look up device, comprising:
a plurality of processors;
a memory coupled to each processor, with each memory containing part of a table of prefixes and decision values organized into p-structures, wherein each p-structure is represented as an array having a first part and a second part, the first part containing forwarding information for the packet called a decision value, and the second part containing a pointer to another p-structure; and
a forwarding decision module coupled to said processors and each of said memory, said forwarding decision module utilizing said processors in parallel to match said address with a longest prefix stored in said table by identifying an associated first p-structure and receiving each subsequent p-structure that a pointer of a previous p-structure points to until a last p-structure having a decision value but no pointer is arrived at and locating the decision value from the last p-structure associated with said prefix.

42. The device of claim 41, wherein said forwarding decision module utilizes said processors in parallel without synchronizing said processors.

43. The device of claim 42, wherein each of said portions of said table contain a value stored with said decision value indicating that a part of said table resides on another processor operating in parallel.

44. A method for forwarding packets, comprising the steps of:
receiving an address for a packet;
matching said address with a longest prefix stored in a routing table constructed using p-structures, wherein each p-structure is represented as an array having a first part and a second part, the first part containing forwarding information for the packet called a decision value, and the second part containing a pointer to another p-structure by identifying an associated first p-structure and receiving each subsequent p-structure that a pointer of a previous p-structure points to until a last p-structure having a decision value but no pointer is arrived at;
retrieving the decision value from the last p-structure associated with said longest prefix; and
forwarding said packet in according with said decision value.

45. The method of claim 44, wherein said step of matching comprises the steps of:
a) initializing a current partition member to a first partition member;
b) translating said address into a p-structure index utilizing partition information stored for said current partition member;
c) storing a decision value associated with said index;
d) determining whether a pointer is associated with said index;
e) setting said current partition member to a next partition member associated with said pointer if there is a pointer associated with said index; and
f) repeating steps b) to e) until there is no pointer associated with said index.

46. An apparatus for forwarding packets, comprising:
means for receiving an address for a packet;
means for matching said address with a longest prefix stored in a routing table constructed using p-structures, wherein each p-structure is represented as an array having a first part and a second part, the first part containing forwarding information for the packet called a decision value, and the second part containing a pointer to another p-structure by identifying an associated first p-structure and receiving each subsequent p-structure that a pointer of a previous p-structure points to until a last p-structure having a decision value but no pointer is arrived at;
means for retrieving the decision value from the last p-structure associated with said longest prefix; and
means for forwarding said packet in accordance with said decision value.

47. The apparatus of claim 46, wherein the means for matching comprises:
a) means for initializing a current partition member to a first partition member;
b) means for translating said address into a p-structure index utilizing partition information stored for said current partition member;
c) means for storing a decision value associated with said index;
d) means for determining whether a pointer is associated with said index;
e) means for setting said current partition member to a next partition member associated with said pointer if there is a pointer associated with said index; and
f) means for utilizing means b) to e) until there is no pointer associated with said index.

48. A computer readable medium whose contents cause a computer system to forward a packet, the computer system having a forwarding decision program with functions for forwarding, by performing the steps of:
receiving an address for a packet;
matching said address with a longest prefix stored in a routing table constructed using p-structures, wherein each p-structure is represented as an array having a first part and a second part, the first part containing forwarding information for the packet called a decision value, and the second part containing a pointer to another p-structure by identifying an associated first p-structure and receiving each subsequent p-structure that a pointer of a previous p-structure points to until a last p-structure having a decision value but no pointer is arrived at;

retrieving the decision value from the last p-structure associated with said longest prefix; and forwarding said packet in accordance with said decision value.

49. The computer readable medium of claim 48, wherein said step of matching comprises the steps of:

a) initializing a current partition member to a first partition member;

b) translating said address into a p-structure index utilizing partition information stored for said current partition member;

c) storing a decision value associated with said index;

d) determining whether a pointer is associated with said index;

e) setting said current partition member to a next partition member associated with said pointer if there is a pointer associated with said index; and f) repeating steps b) to e) until there is no pointer associated with said index.

50. A method for locating a decision value, comprising the steps of:

receiving an address for a packet;

matching said address with a longest prefix stored in a table constructed using p-structures, wherein each p-structure is represented as an array having a first part and a second part, the first part containing forwarding information for the packet called a decision value, and the second part containing a pointer to another p-structure by identifying an associated first p-structure and receiving each subsequent p-structure that a pointer of a previous p-structure points to until a last p-structure having a decision value but no pointer is arrived at; and retrieving the decision value from the last p-structure associated with said longest prefix.

51. The method of claim 50, wherein said step of matching comprises the steps of:

a) initializing a current partition member to a first partition member;

b) translating said address into a p-structure index utilizing partition information stored for said current partition member;

c) storing a decision value associated with said index;

d) determining whether a pointer is associated with said index;

e) setting said current partition member to a next partition member associated with said pointer if there is a pointer associated with said index; and f) repeating steps b) to e) until there is no pointer associated with said index.

52. An apparatus for locating a decision value, comprising the steps of:

means for receiving an address for a packet;

means for matching said address with a longest prefix stored in a table constructed using p-structures, wherein each p-structure is represented as an array having a first part and a second part, the first part containing forwarding information for the packet called a decision value, and the second part containing a pointer to another p-structure by identifying an associated first p-structure and receiving each subsequent p-structure that a pointer of a previous p-structure points to until a last p-structure having a decision value but no pointer is arrived at; and means for retrieving the decision value from the last p-structure associated with said longest prefix.

53. The apparatus of claim 52, wherein said step of matching comprises the steps of:

a) means for initializing a current partition member to a first partition member;

b) means for translating said address into a p-structure index utilizing partition information stored for said current partition member;

c) means for storing a decision value associated with said index;

d) means for determining whether a pointer is associated with said index;

e) means for setting said current partition member to a next partition member associated with said pointer if there is a pointer associated with said index; and f) means for utilizing means b) to e) until there is no pointer associated with said index.

54. A computer readable medium whose contents cause a computer system to locate a decision value in a routing table, the computer system having a forwarding decision program with functions for locating, by performing the steps of:

receiving an address for a packet;

matching said address with a longest prefix stored in a routing table constructed using p-structures, wherein each p-structure is represented as an array having a first part and a second part, the first part containing forwarding information for the packet called a decision value, and the second part containing a pointer to another p-structure by identifying an associated first p-structure and receiving each subsequent p-structure that a pointer of a previous p-structure points to until a last p-structure having a decision value but no pointer is arrived at; and retrieving the decision value from the last p-structure associated with said longest prefix.

55. The computer readable medium of claim 54, wherein said step of matching comprises the steps of:

a) initializing a current partition member to a first partition member;

b) translating said address into a p-structure index utilizing partition information stored for said current partition member;

c) storing a decision value associated with said index;

d) determining whether a pointer is associated with said index;

e) setting said current partition member to a next partition member associated with said pointer if there is a pointer associated with said index; and f) repeating steps b) to e) until there is no pointer associated with said index.

* * * * *